US010719712B2

(12) United States Patent
Gupta et al.

(10) Patent No.: US 10,719,712 B2
(45) Date of Patent: Jul. 21, 2020

(54) CLASSIFY ACTIONS IN VIDEO SEGMENTS USING PLAY STATE INFORMATION

(71) Applicant: CANON KABUSHIKI KAISHA, Tokyo (JP)

(72) Inventors: Amit Kumar Gupta, Carlingford (AU); Jie Xu, Eastwood (AU); Nagita Mehr Seresht, West Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 15/905,009

(22) Filed: Feb. 26, 2018

(65) Prior Publication Data
US 2019/0266407 A1 Aug. 29, 2019

(51) Int. Cl.
G06K 9/00 (2006.01)
(52) U.S. Cl.
CPC ............ *G06K 9/00724* (2013.01); *G06K 2009/00738* (2013.01)
(58) Field of Classification Search
CPC combination set(s) only.
See application file for complete search history.

(56) References Cited

U.S. PATENT DOCUMENTS

| 7,006,945 | B2* | 2/2006 | Li | G06K 9/00711 386/281 |
| 7,231,088 | B2* | 6/2007 | Echigo | G06T 7/20 348/700 |
| 8,855,375 | B2* | 10/2014 | Macciola | G06T 7/194 382/112 |
| 9,473,748 | B2 | 10/2016 | Elangovan et al. | |
| 2002/0018594 | A1* | 2/2002 | Xu | G06K 9/00711 382/190 |
| 2003/0034996 | A1* | 2/2003 | Li | G06F 16/739 715/719 |
| 2003/0049590 | A1* | 3/2003 | Feldbau | A63B 24/0021 434/251 |
| 2005/0159956 | A1* | 7/2005 | Rui | G06K 9/00711 704/275 |
| 2007/0104368 | A1* | 5/2007 | Miyamori | G06T 7/20 382/181 |
| 2008/0068463 | A1* | 3/2008 | Claveau | H04N 5/262 348/157 |
| 2008/0192116 | A1* | 8/2008 | Tamir | G06T 7/292 348/157 |
| 2009/0046152 | A1* | 2/2009 | Aman | A63B 24/0021 348/157 |
| 2009/0110372 | A1* | 4/2009 | Morioka | G11B 27/034 386/248 |

(Continued)

*Primary Examiner* — Tsung Yin Tsai
(74) *Attorney, Agent, or Firm* — Canon U.S.A., Inc. IP Division

(57) ABSTRACT

An apparatus for classifying an action in a video of a sports event including receiving a first video segment and a second video segment in the sports video, wherein the second video segment is the segment after next of the first video segment; receiving a predetermined play state of the first video segment and a different predetermined play state of the second video segment, locating a play object in one of a predetermined set of regions in a field of the sports event in the second segment; determining a role of a player interacting with the play object when the play object is located one of the predetermined set of regions in the second video segment; and classifying the action in the first video segment based on the located play object and the determined role.

8 Claims, 19 Drawing Sheets

(56) References Cited

U.S. PATENT DOCUMENTS

| | | | | |
|---|---|---|---|---|
| 2009/0257649 A1* | 10/2009 | Yamauchi | G06K 9/00751 | 382/165 |
| 2012/0162435 A1* | 6/2012 | Elangovan | G06T 7/20 | 348/157 |
| 2013/0016877 A1* | 1/2013 | Feris | G06K 9/00771 | 382/103 |
| 2013/0148861 A1* | 6/2013 | Ferlatte | G06K 9/00624 | 382/107 |
| 2013/0178304 A1* | 7/2013 | Chan | A63B 69/36 | 473/266 |
| 2014/0074263 A1* | 3/2014 | Balakrishnan | A63B 71/0686 | 700/91 |
| 2014/0161356 A1* | 6/2014 | Tesch | H04L 51/063 | 382/196 |
| 2015/0257682 A1* | 9/2015 | Hansen | A61B 5/7475 | 382/103 |
| 2015/0310280 A1* | 10/2015 | Bentley | G06F 16/7837 | 382/103 |
| 2015/0317801 A1* | 11/2015 | Bentley | H04N 7/181 | 382/107 |
| 2015/0318015 A1* | 11/2015 | Bose | H04N 7/188 | 386/248 |
| 2015/0348591 A1* | 12/2015 | Kaps | G11B 27/17 | 386/201 |
| 2016/0169692 A1* | 6/2016 | Gupta | G01C 21/3469 | 701/521 |
| 2016/0292881 A1* | 10/2016 | Bose | G06K 9/00342 | |
| 2017/0238055 A1* | 8/2017 | Chang | G06F 3/013 | 725/19 |
| 2017/0262697 A1* | 9/2017 | Kaps | A63F 13/812 | |

* cited by examiner

CLASSIFY ACTIONS IN VIDEO SEGMENTS USING PLAY STATE INFORMATION

TECHNICAL FIELD

The present invention relates to classifying actions in video segments in a video sequence using visual features, play states and play-object position information. In particular, the present invention includes a method, apparatus and system for classifying actions over time using the states of play in video segments, player roles, and position of the play-object. The present disclosure also relates to a computer program product including a computer readable medium having recorded thereon a computer program for classifying actions in video segments using the states of the video segments, player roles and the position of the play-object occurring in the segments.

BACKGROUND

Human action recognition becomes increasingly important in a wide range of video surveillance, sport analysis, and video digest generation applications. For example, detecting suspicious human activities in surveillance videos has the potential to predict terrorist attacks and other potential threats to human safety.

Known action recognition methods train a classifier for the actions of interest based on visual features, using a given training set containing samples of the action of interest. The trained classifier is then applied to fixed length and often overlapping temporal segments of a new (unseen) video and the actions of interest are recognised by processing the classification scores. However recognising interactions only from the visual differences in the way actions are performed can be very challenging, as sometimes there are subtle visual differences in the way a person performs an action depending on their intention. For example a soccer player may kick the ball differently when his intention is to pass the ball to another player compared to the situation where his intention is to shoot a goal with the aim of scoring a point for his team. To alleviate the issues with using visual features, features derived from the tracking outputs of humans and objects occurring in video segments may also be employed to train classifiers. These tracking based features are expected to provide additional information about the human activities in those video segments. For example, when a soccer player is shooting a goal, quite often the soccer ball travels at a higher speed than it does in other situations. In this case, an increase of the ball velocity may be observed. Likewise, when a soccer ball is passed between two nearby soccer players, the observed ball velocity is anticipated to be low. Nevertheless, recognising actions is still challenging as high-quality tracking is difficult to guarantee. Human and object tracking is often limited by environmental factors such as location of the cameras, resolution of cameras, and occlusions amongst humans.

SUMMARY

It is an object of the present invention to substantially overcome, or at least ameliorate, one or more disadvantages of existing arrangements.

Disclosed are arrangements, referred to as Play State Information (PSI) arrangements, which seek to address the above problems by identifying an action in a first video segment based upon a play state in a later video segment.

According to a first aspect of the present invention, there is provided a method of classifying an action in a video of a sports event, the method comprising:
    receiving a first video segment and a second video segment in the sports video, wherein the second video segment is the segment after next of the first video segment;
    receiving a predetermined play state of the first video segment and a predetermined play state of the second video segment, the predetermined play state of the first video segment being different from the predetermined play state of the second video segment;
    locating a play object in one of a predetermined set of regions in a field of the sports event in the second segment;
    determining a role of a player interacting with the play object when the play object is located one of the predetermined set of regions in the second video segment; and
    classifying the action in the first video segment based on the located play object and the determined role.

According to another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
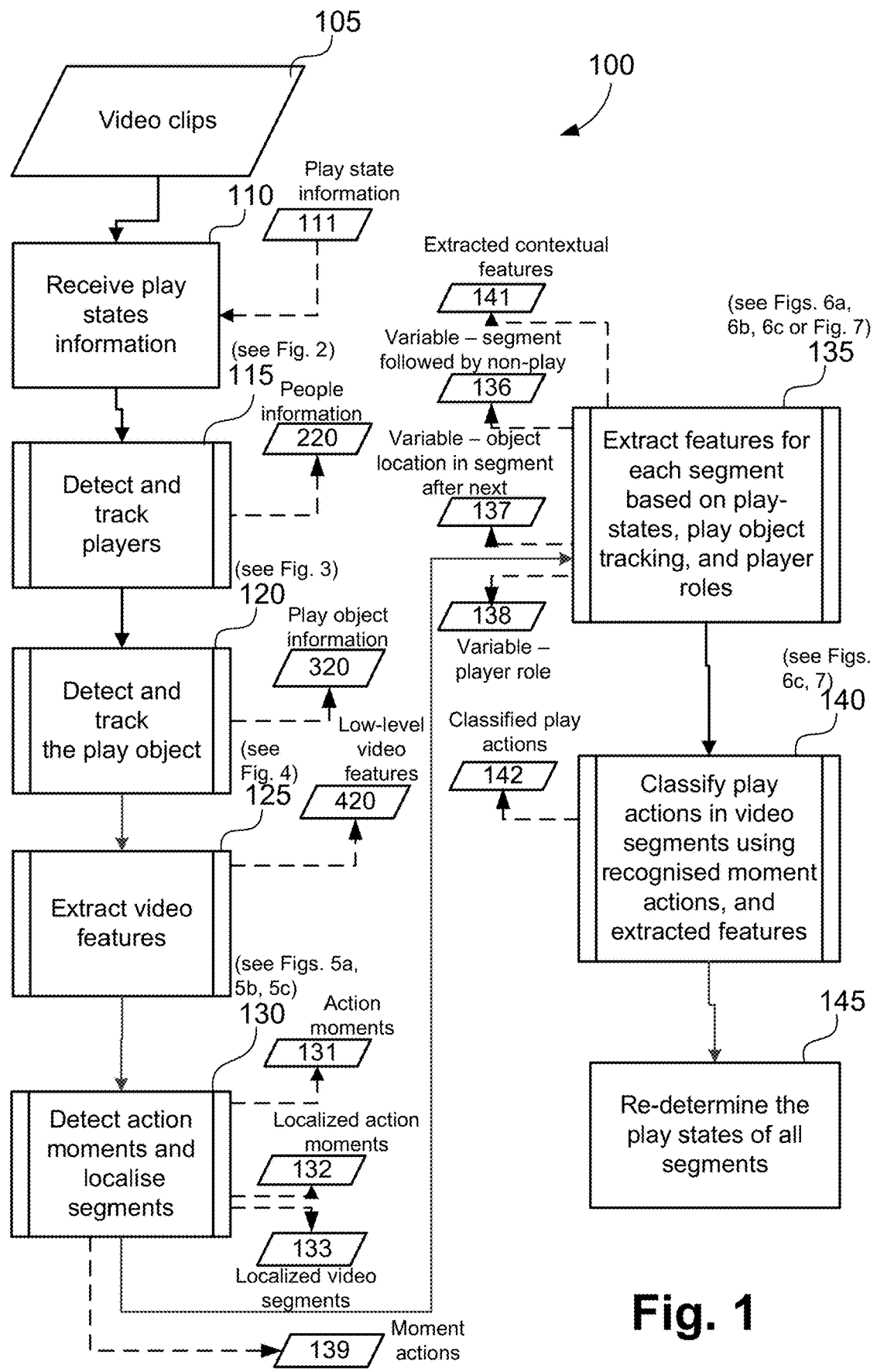
FIG. 1 is a schematic flow diagram illustrating a method of classifying actions according to an embodiment of the invention.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such discussions should not be interpreted as a representation by the present inventor(s) or the patent applicant that such documents or devices in any way form part of the common general knowledge in the art.

The inventors have realized that there is a need for a classification algorithm that overcomes the disadvantages of visual and tracking based features.

Context

Video analysis can be used to help improve the performance of teams and individuals. Coaches can analyse videos of live action to provide helpful feedback for teams. Athletes can also improve their strengths by using video analysis. From video analysis, an athlete can discover weakness that may be holding him/her back. For example, a basketball player may be weak in defending. Once the weakness is identified, the athlete can work on overcoming the identified weakness and thus improve their performance. Video analysis can also be used to help athletes prevent injuries, which is an important part of every sport. Video analysis allows an athlete to study his/her own techniques and pinpoint areas that must be changed in order to avoid future injuries. The feedback from video analysis also may be used to help in injury rehabilitation. Quite often a video analysis system requires inputs from a human evaluator/annotator (e.g., scout). Specifically a human evaluator (e.g., scout) marks the video (either in real-time or after the game) to identify chosen action moments such as goals, errors, specific plays, and potentially lost or created opportunities by each player. The system can then allow the user to filter and watch their desired aspects of the game, such as all goals by a specific player, or attacks by a specific team. Game highlights may also be generated using the annotations. However, manual inspection of the videos is expensive. The time required for manually annotating the video is often proportional to the length of the game. The growing volumes of sport videos also add to the difficulty. Furthermore, manual inspection may degrade due to fatigue caused by long analysis time, and different scouts may use different guidelines in their annotations. There is therefore a demand for automated video analysis.

Action recognition plays an important role in automated video analysis. Recognition of low-level single-person actions is an important element in video analysis. Typically action classifiers are trained using the low-level features that are extracted from videos. The trained action classifiers are then employed to predict actions of individuals. Human activity recognition in scenes that involve group activities, for example group activities in sports games can be of interest. Hierarchical graphical models can be used to model useful cues in order to distinguish different actions.

One important cue for disambiguating actions is the context set by rules of the sports game.

The game state depicted by the video is also a useful contextual cue for action recognition. For example, a soccer game often pauses after a goal is made.

Besides the game state depicted in the video, the locations of objects also provide strong contextual information for action recognition. For example, after a shoot-success, the soccer game often pauses and then restarts with the soccer ball at the field centre.

Furthermore, the role of a player is also an important cue for action recognition. For example, after a shoot failure, quite often the goalie starts the game by kicking the ball at the goal area. It is therefore advantageous to consider these factors, namely the game states, object locations, and player roles, for recognising actions.

The present disclosure facilitates rich semantic understanding of actions in video sequences, and in particular the recognition of actions using the game states, object locations, and player roles over time.

For the purpose of this disclosure the following terms are defined:

The term detection is used to refer to the joint task of localising and classifying. For example, detecting a set of actions of interest includes localising all the occurrences (also called instances) of the actions of interest in a video sequence and assigning a class label to the localised instances.

The term recognition may also be used interchangeably with the term detection.

The term moment refers to a particular timestamp, and the term moment action refers to the act of doing something at a particular moment, and a moment action concerns only one person. For example, a "kicking" moment action occurs at the moment when the ball is kicked by a soccer player (as described hereinafter in more detail with reference to FIG. 9). Specifically, the sequence 905, 910, 915, 920, 925, 930 represents a temporally ordered sequence of timestamps, and each of the timestamps represents a moment. The actions occurring at each of the temporal sequence moments 905, 910, 915, 920, 925, 930 are considered to be moment actions. In this disclosure, a moment can be further classified as either an action moment, or a non-action moment.

An action moment indicates a timestamp at which an action occurs. For example, a "kicking" moment action occurs at an action moment. An action moment also refers to play object-related moments of significance. For example, a moment when ball crosses the court boundary and goes outside is also referred to an action moment. Two examples of ball-related action moments are hall-going-off-field and hall-in-goal-area.

On the other hand, a non-action moment implies that no action happens at the related timestamp. In this example, if the kicking moment action takes place at moment 905, then the moment 905 may be considered as an action moment. If there is no action happening at moment 910, then 910 may be considered as a non-action moment.

Figure 9:
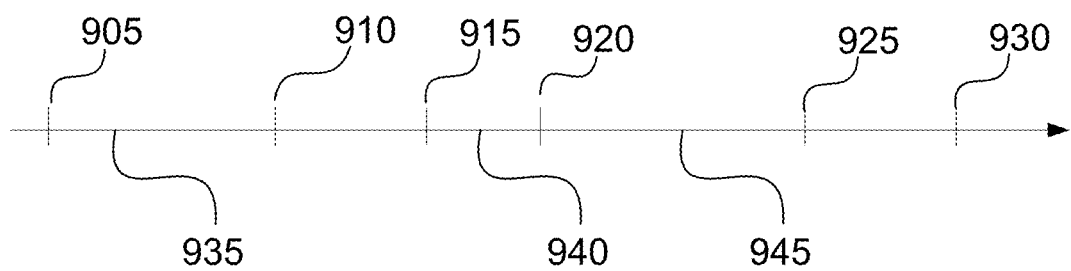
FIG. 9 is a diagram illustrating of the concept of moments and plays, and also their related actions according to the present disclosure.

The term play refers to a temporal interval between a pair of action moments. For example, in FIG. 9, 935 represents a play which corresponds to (ie occurs in) the interval between two action moments, namely 905 and 910, and the action moments 905 and 910 are considered as the start and end action moments of the play 935 respectively. Similarly, 940 represents a play that corresponds to the interval between action moment 915 and 920.

The term play action refers to the interaction between two persons, one from each member of the moment action pair or an interaction between one person and a play object between two action moments, one or both of which may be play-object-related action moment. The two persons engaged in an interaction are termed as play-agent and play-target, where the play-agent initiates the interaction while the play-target is the recipient of the interaction. For example, a "pass" play action in soccer typically involves two soccer players—a first player (play-agent) kicks the ball at time $t_1$ and a second player (play-target) from the same team obtains the control of the ball at a later time $t_2$. The tracking meta data identifier for players is used to represent play-agent and play-target. For ball—related action moments, the play-target is empty i.e. not required and is represented by a pre-defined value for play-target such as −1.

The term play object refers to the object that is used in the interaction of play-agent and play-target. For example, the play object in a soccer game is the soccer ball.

The term play state refers to the states of a play in a sports game. Play state may be: an on state (also referred to as an on-play state—which indicates that the game is ongoing, and an off state (also referred to as a non-play state—which implies that the game is paused.

In particular, we use the term Non-play to refer to the period when the play state is an off state.

The term video sequence or video clip is used to refer to a recording of an event or scene as a set of images with temporal ordering.

The images forming a video sequence are called 'frames.' The position of a frame in a video sequence is called the frame number. The frame number may be used to refer to the relative timing of an action or event in a video sequence. An action which happens after another action must be associated with a later time (i.e., a succeeding frame number).

The term video segment may be used to refer to a part of a video sequence. The frames in a video segment are temporally consecutive. In this disclosure, a video segment corresponds to a play and has a play state. The term segment may be used interchangeably with the term play. The term segment-after-next may be defined with regard to each segment. In particular, for a segment corresponding to a t-th play, the segment-after-next is defined as the segment corresponding to the (t+N)-th play, where N is a positive number greater than or equal to 2. In this disclosure, N is set to be 2. For example, in FIG. 9, the segment-after-next for play 935 is play 940.

The term people refers to a group of interacting agents. Each agent in the group is referred to as a person. A person may mean a living creature or an automated robot.

The term role is associated with a person. In particular, in this disclosure, we use the term role to refer to a set of expected behaviour, rights and obligations related to the functionality of the corresponding person in a group of people. For example, the role of a player in a soccer game may be a goal keeper, an attacker, or a defender.

The localisation of moment action refers to associating an action to an object involved in the action, and temporally localising by associating the action to a particular frame in the video sequence. The localisation of play action refers to the task of finding the spatial and temporal extent of the play action. In particular, localisation of play action includes finding the start and end frames (i.e., time), and the play agent and the play-target of the interaction.

The term classification (also called categorisation) is the task of assigning an input to a certain group (also called class or category). The output of classification is the label of the group that the input has been assigned to. The assignment of an input to a class is generally based on certain characteristics of the input which are called features. When classes are formed based on some ontology, the classification provides semantic understanding.

In one example, the described PSI arrangements are used to analyse and semantically label a video in an archive, for example in a video retrieval system. In another example, a live video feed is analysed and an alert is issued to an operator when an interaction of interest is observed in the video feed.

Overview

Figure 11A:
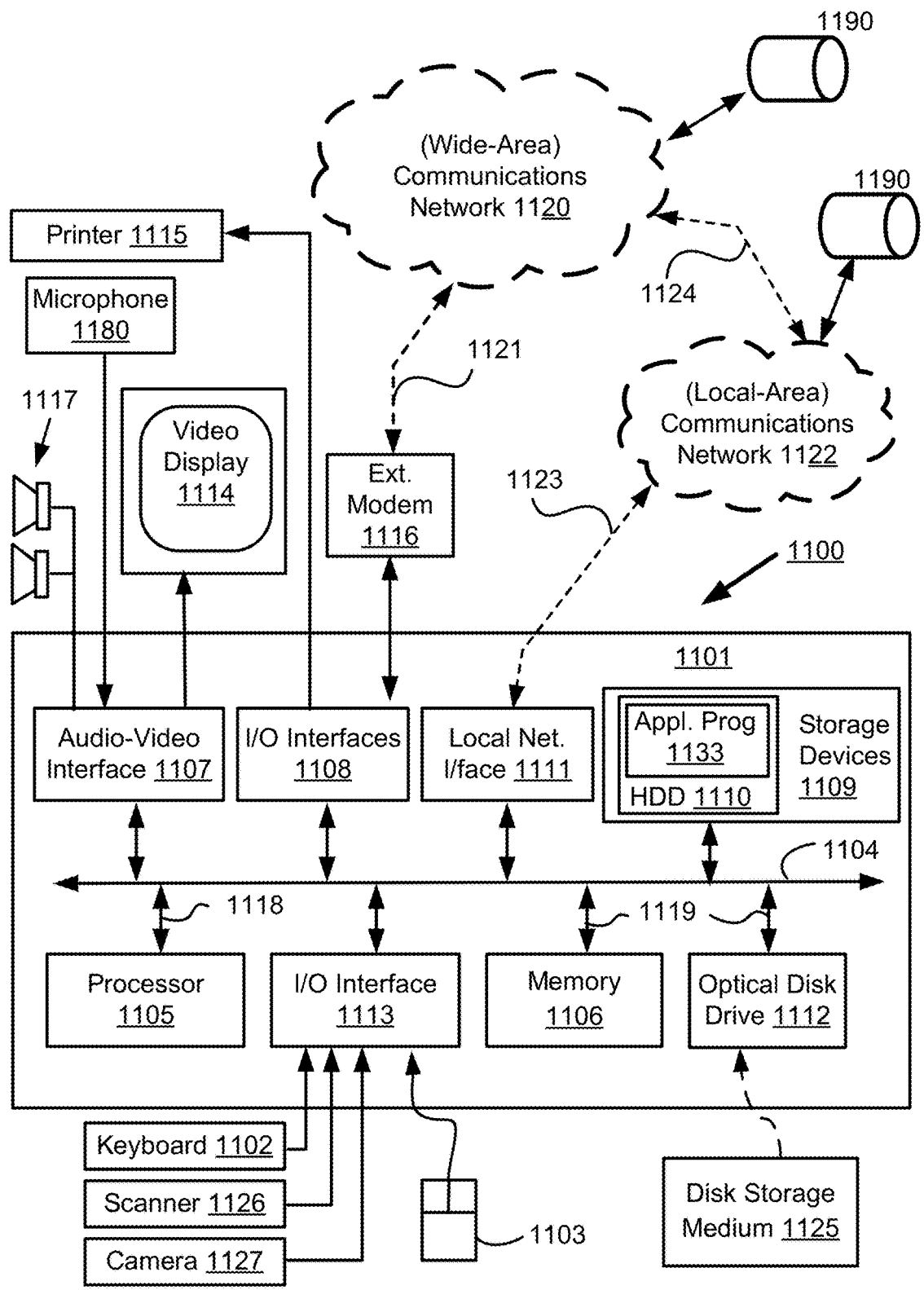
FIGS. 11a and 11b form a schematic block diagram of a general purpose computer system upon which arrangements described can be practiced.
Figure 11B:
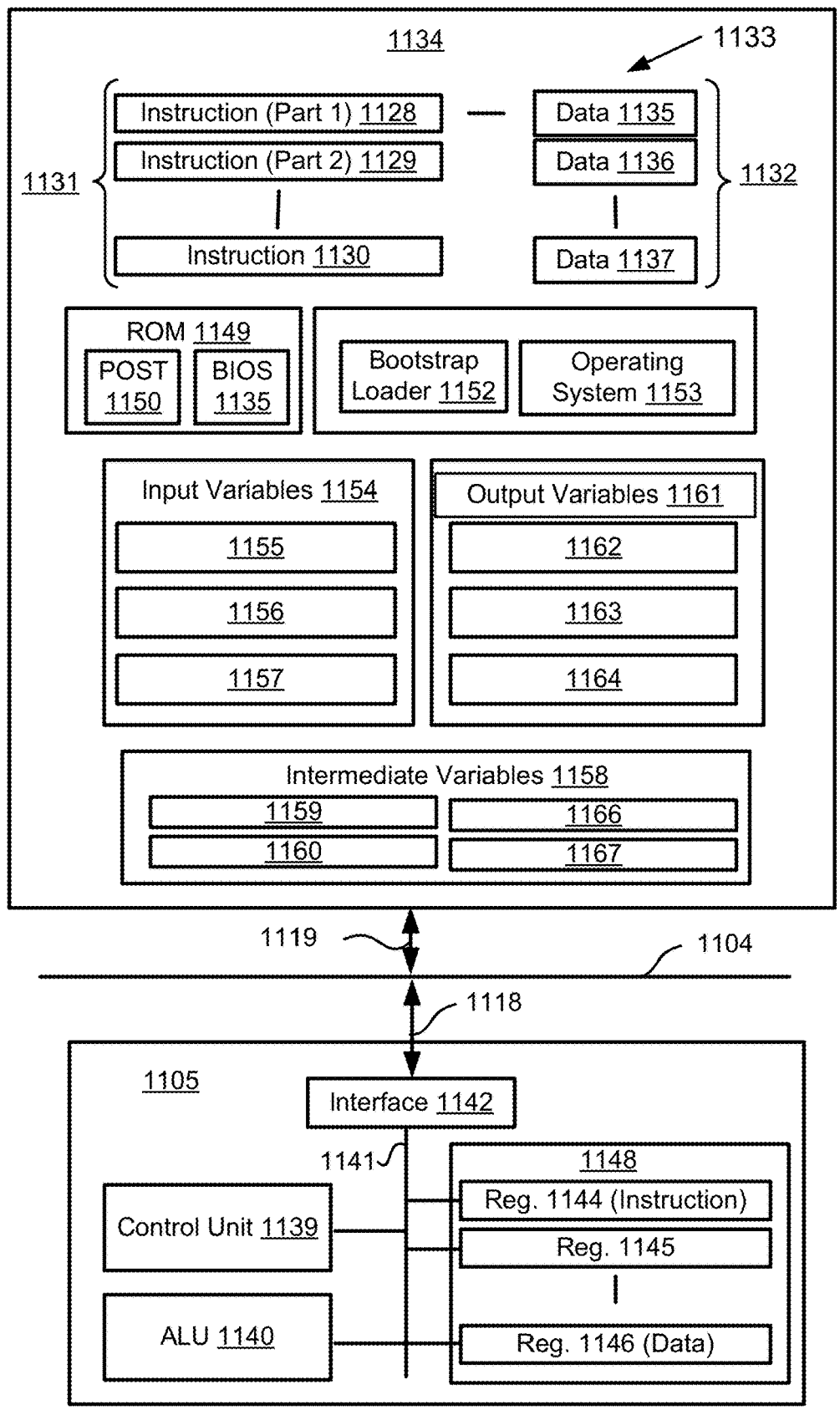

FIGS. 11A and 11B depict a general-purpose computer system 1100, upon which the various PSI arrangements described can be practiced.

As seen in FIG. 11A, the computer system 1100 includes: a computer module 1101; input devices such as a keyboard 1102, a mouse pointer device 1103, a scanner 1126, a camera 1127, and a microphone 1180; and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The communications network 1120 may be a wide-area network (WAN), such as the Internet, a cellular telecommunications network, or a private WAN. Where the connection 1121 is a telephone line, the modem 1116 may be a traditional "dial-up" modem. Alternatively, where the connection 1121 is a high capacity (e.g., cable) connection, the modem 1116 may be a broadband modem. A wireless modem may also be used for wireless connection to the communications network 1120.

The computer module 1101 typically includes at least one processor unit 1105, and a memory unit 1106. For example, the memory unit 1106 may have semiconductor random access memory (RAM) and semiconductor read only memory (ROM). The computer module 1101 also includes an number of input/output (I/O) interfaces including: an audio-video interface 1107 that couples to the video display 1114, loudspeakers 1117 and microphone 1180; an I/O interface 1113 that couples to the keyboard 1102, mouse 1103, scanner 1126, camera 1127 and optionally a joystick or other human interface device (not illustrated); and an interface 1108 for the external modem 1116 and printer 1115. In some implementations, the modem 1116 may be incorporated within the computer module 1101, for example within the interface 1108. The computer module 1101 also has a local network interface 1111, which permits coupling of the computer system 1100 via a connection 1123 to a local-area communications network 1122, known as a Local Area Network (LAN). As illustrated in FIG. 11A, the local communications network 1122 may also couple to the wide network 1120 via a connection 1124, which would typically include a so-called "firewall" device or device of similar functionality. The local network interface 1111 may comprise an Ethernet circuit card, a Bluetooth® wireless arrangement or an IEEE 802.11 wireless arrangement; however, numerous other types of interfaces may be practiced for the interface 1111.

The I/O interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1100.

The components 1105 to 1113 of the computer module 1101 typically communicate via an interconnected bus 1104 and in a manner that results in a conventional mode of operation of the computer system 1100 known to those in the relevant art. For example, the processor 1105 is coupled to the system bus 1104 using a connection 1118. Likewise, the memory 1106 and optical disk drive 1112 are coupled to the system bus 1104 by connections 1119. Examples of computers on which the described arrangements can be practised include IBM-PC's and compatibles, Sun Sparcstations, Apple Mac™ or like computer systems.

The PSI method may be implemented using the computer system 1100 wherein the processes of FIGS. 1-4, 5a, 5c, 5e, 5f, 6a, 6c, 7 and 10, to be described, may be implemented as one or more software application programs 1133 executable within the computer system 1100. In particular, the steps of the PSI method are effected by instructions 1131 (see FIG. 11B) in the software 1133 that are carried out within the computer system 1100. The software instructions 1131 may be formed as one or more code modules, each for performing one or more particular tasks. The software may also be divided into two separate parts, in which a first part and the corresponding code modules performs the PSI methods and a second part and the corresponding code modules manage a user interface between the first part and the user. The software may be stored in a computer readable medium, including the storage devices described below, for example. The software is loaded into the computer system 1100 from the computer readable medium, and then executed by the computer system 1100. A computer readable medium having such software or computer program recorded on the computer readable medium is a computer program product. The use of the computer program product in the computer system 1100 preferably effects an advantageous PSI apparatus.

The PSI software 1133 is typically stored in the HDD 1110 or the memory 1106. The software is loaded into the computer system 1100 from a computer readable medium, and executed by the computer system 1100. Thus, for example, the software 1133 may be stored on an optically readable disk storage medium (e.g., CD-ROM) 1125 that is read by the optical disk drive 1112. A computer readable medium having such software or computer program recorded on it is a computer program product. The use of the computer program product in the computer system 1100 preferably effects a PSI apparatus.

In some instances, the application programs 1133 may be supplied to the user encoded on one or more CD-ROMs 1125 and read via the corresponding drive 1112, or alternatively may be read by the user from the networks 1120 or 1122. Still further, the software can also be loaded into the computer system 1100 from other computer readable media. Computer readable storage media refers to any non-transitory tangible storage medium that provides recorded instructions and/or data to the computer system 1100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1101. Examples of transitory or non-tangible computer readable transmission media that may also participate in the provision of software, application programs, instructions and/or data to the computer module 1101 include radio or infra-red transmission channels as well as a network connection to another computer or networked device, and the Internet or Intranets including e-mail transmissions and information recorded on Websites and the like.

The second part of the application programs 1133 and the corresponding code modules mentioned above may be executed to implement one or more graphical user interfaces (GUIs) to be rendered or otherwise represented upon the display 1114. Through manipulation of typically the keyboard 1102 and the mouse 1103, a user of the computer system 1100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1117 and user voice commands input via the microphone 1180.

FIG. 11B is a detailed schematic block diagram of the processor 1105 and a "memory" 1134. The memory 1134 represents a logical aggregation of all the memory modules (including the HDD 1109 and semiconductor memory 1106) that can be accessed by the computer module 1101 in FIG. 11A.

When the computer module 1101 is initially powered up, a power-on self-test (POST) program 1150 executes. The POST program 1150 is typically stored in a ROM 1149 of the semiconductor memory 1106 of FIG. 11A. A hardware device such as the ROM 1149 storing software is sometimes referred to as firmware. The POST program 1150 examines hardware within the computer module 1101 to ensure proper functioning and typically checks the processor 1105, the memory 1134 (1109, 1106), and a basic input-output systems software (BIOS) module 1151, also typically stored in the ROM 1149, for correct operation. Once the POST program 1150 has run successfully, the BIOS 1151 activates the hard disk drive 1110 of FIG. 11A. Activation of the hard disk drive 1110 causes a bootstrap loader program 1152 that is resident on the hard disk drive 1110 to execute via the processor 1105. This loads an operating system 1153 into the RAM memory 1106, upon which the operating system 1153 commences operation. The operating system 1153 is a system level application, executable by the processor 1105, to fulfil various high level functions, including processor management, memory management, device management, storage management, software application interface, and generic user interface.

The operating system 1153 manages the memory 1134 (1109, 1106) to ensure that each process or application running on the computer module 1101 has sufficient memory in which to execute without colliding with memory allocated to another process. Furthermore, the different types of memory available in the system 1100 of FIG. 11A must be used properly so that each process can run effectively. Accordingly, the aggregated memory 1134 is not intended to illustrate how particular segments of memory are allocated (unless otherwise stated), but rather to provide a general view of the memory accessible by the computer system 1100 and how such is used. As shown in FIG. 11B, the processor 1105 includes a number of functional modules including a control unit 1139, an arithmetic logic unit (ALU) 1140, and a local or internal memory 1148, sometimes called a cache memory. The cache memory 1148 typically includes a number of storage registers 1144-1146 in a register section. One or more internal busses 1141 functionally interconnect these functional modules. The processor 1105 typically also has one or more interfaces 1142 for communicating with external devices via the system bus 1104, using a connection 1118. The memory 1134 is coupled to the bus 1104 using a connection 1119.

The application program 1133 includes a sequence of instructions 1131 that may include conditional branch and loop instructions. The program 1133 may also include data 1132 which is used in execution of the program 1133. The instructions 1131 and the data 1132 are stored in memory locations 1128, 1129, 1130 and 1135, 1136, 1137, respectively. Depending upon the relative size of the instructions 1131 and the memory locations 1128-1130, a particular instruction may be stored in a single memory location as depicted by the instruction shown in the memory location 1130. Alternately, an instruction may be segmented into a number of parts each of which is stored in a separate memory location, as depicted by the instruction segments shown in the memory locations 1128 and 1129.

In general, the processor 1105 is given a set of instructions which are executed therein. The processor 1105 waits for a subsequent input, to which the processor 1105 reacts to by executing another set of instructions. Each input may be provided from one or more of a number of sources, including data generated by one or more of the input devices 1102, 1103, data received from an external source across one of the networks 1120, 1102, data retrieved from one of the storage devices 1106, 1109 or data retrieved from a storage medium 1125 inserted into the corresponding reader 1112, all depicted in FIG. 11A. The execution of a set of the instructions may in some cases result in output of data. Execution may also involve storing data or variables to the memory 1134.

The disclosed PSI arrangements use input variables 1154, which are stored in the memory 1134 in corresponding memory locations 1155, 1156, 1157. The PSI arrangements produce output variables 1161, which are stored in the memory 1134 in corresponding memory locations 1162, 1163, 1164. Intermediate variables 1158 may be stored in memory locations 1159, 1160, 1166 and 1167.

Referring to the processor 1105 of FIG. 11B, the registers 1144, 1145, 1146, the arithmetic logic unit (ALU) 1140, and the control unit 1139 work together to perform sequences of micro-operations needed to perform "fetch, decode, and execute" cycles for every instruction in the instruction set making up the program 1133. Each fetch, decode, and execute cycle comprises:

a fetch operation, which fetches or reads an instruction 1131 from a memory location 1128, 1129, 1130;

a decode operation in which the control unit 1139 determines which instruction has been fetched; and an execute operation in which the control unit 1139 and/or the ALU 1140 execute the instruction.

Thereafter, a further fetch, decode, and execute cycle for the next instruction may be executed. Similarly, a store cycle may be performed by which the control unit 1139 stores or writes a value to a memory location 1132.

Each step or sub-process in the processes of FIGS. 1-4, 5*a*, 5*c*, 5*e*, 5*f*, 6*a*, 6*c*, 7 and 10 is associated with one or more segments of the program 1133 and is performed by the register section 1144, 1145, 1147, the ALU 1140, and the control unit 1139 in the processor 1105 working together to perform the fetch, decode, and execute cycles for every instruction in the instruction set for the noted segments of the program 1133.

The PSI method may alternatively be implemented in dedicated hardware such as one or more integrated circuits performing the PSI functions or sub functions. Such dedicated hardware may include graphic processors, digital signal processors, or one or more microprocessors and associated memories.

FIGS. 1 to 7 depict one or more PSI embodiments with soccer/futsal games in sport analysis as an example target use-case. Nevertheless, the PSI arrangement can be used in other use-cases and domains such as surveillance, safety and security and marketing analysis. In this disclosure, the following play action types are considered: (1) shoot-success: the play action in which a player has made a goal; (2) shoot-failure: the play action in which a player attempts to shoot a goal but fails; and (3) clearance play: the play action in which a player kicks the ball out of field. The disclosed PSI arrangements can be easily extended to additional play types. FIG. 1 depicts a method 100, performed by the processor 1105 executing the PSI software program 1133, which performs classification of play action using play states, play object tracking and player role information over time. The method 100 accepts one video clip 105 at a time that contain actions of people as input.

In this disclosure the method 100 applies to single-view videos. A single-view video refers to video captured by a fixed field-of-view camera. For multi-view videos, the same method 100 can be applied to each view to produce play action classification for each view. The classifications from all views can then be consolidated to generate play action classification output for multi-views. The consolidation methods may include, but not limited to averaging response, majority voting or winner-takes-all.

The action detection method 100 receives play state information 111 for all the video clips 105 at a step 110, performed by the processor 1105 executing the PSI software program 1133. The play state information 111 is an input to the PSI system. The play states may include, but are not limited to, the on state which means the game is on-going, and the off state which indicates that the game is paused or terminated. In this disclosure, the plays whose states are off are referred to as non-plays. The play state information may specify the play state at each frame of the video clips. The play state information can be generated by manual annotation of the input video clips 105.

The action detection method 100 then proceeds to a people tracking step 115 (described hereinafter in more detail with reference to FIG. 2), performed by the processor 1105 executing the PSI software program 1133, which identifies a plurality of people in the video sequence, thereby producing people tracking information 220.

The action detection method 100 progresses from the people tracking step 115 to a play object tracking step 120, performed by the processor 1105 executing the PSI software program 1133 and described hereinafter in more detail with reference to FIG. 3, which identifies a play object (described by play object information 320) used in the sports game in question across all video frames.

In ball-based sports games, the play object is often the ball. However the play object can be replaced with an alternative object of interest relevant to the target use-case. A track determined for the object of interest (for example the ball) may be used in an action moment detection and segment localisation step 130 to improve the localisation (and detection) accuracy.

The action detection method 100 progresses from the play object tracking step 120 to a video feature extraction step 125, performed by the processor 1105 executing the PSI software program 1133 and described hereinafter in more detail with reference to FIG. 4, which extracts low-level video features 420 from the inputted video clips 105. The extracted low-level features 420 are used by the step 130 for estimating moment actions 139 of the plurality of people identified in the step 115.

Once the video features 420 are extracted by the feature extraction step 125, the action detection method 100 is directed to an action moment detection step 130, performed by the processor 1105 executing the PSI software program 1133 and described hereinafter in more detail with reference to FIGS. 5a, 5b and 5c collectively, which detects and classifies action moments 131 associated with the plurality of people (described by the information 220) identified at the people tracking step 115. This step 130 involves training action moment classifiers and applying them on the extracted video features 420. In particular, the classifiers are trained based on the extracted video features for different action moment classes. A method of training action moment classifiers, as associated with action detection step 130, is described hereafter with reference to FIGS. 5a and 5b collectively. A method of detecting (localising and classifying) action moments, as executed at moment action detection step 130, is described hereafter with reference to FIG. 5c. The detection i.e. localisation and classification of action moments generate moment actions at the action moments at step 130. Some examples of moment actions are Leg-kick, Leg-receive, and Dribble-moment. It is to be noted, the player whose action tube results in an action moment, is termed as the associated player (play-agent or play-target depending on the temporal position of the action moment in the play).

Apart from detection player related action moments, the ball-related action moments are detected using the ball tracking information generated by the module 120. The following rule is used for determining ball-going-off-field and ball-in-goal moments.

For a temporal period of T frames (e.g. T=6 frames), if location of ball for t=1 to t=2 frames is in the playing field and the location of ball for t=3 to t=6 frames is outside the playing field, the frame t=3 is termed as ball-off-field action moment. Similarly, for a temporal period of T frames (e.g. T=6 frames), if location of ball for t=1 to t=2 frames is in the playing field and the location of ball for t=3 to t=6 frames is in the goal area, the frame t=3 is termed as ball-in-goal-area action moment.

Figure 5A:
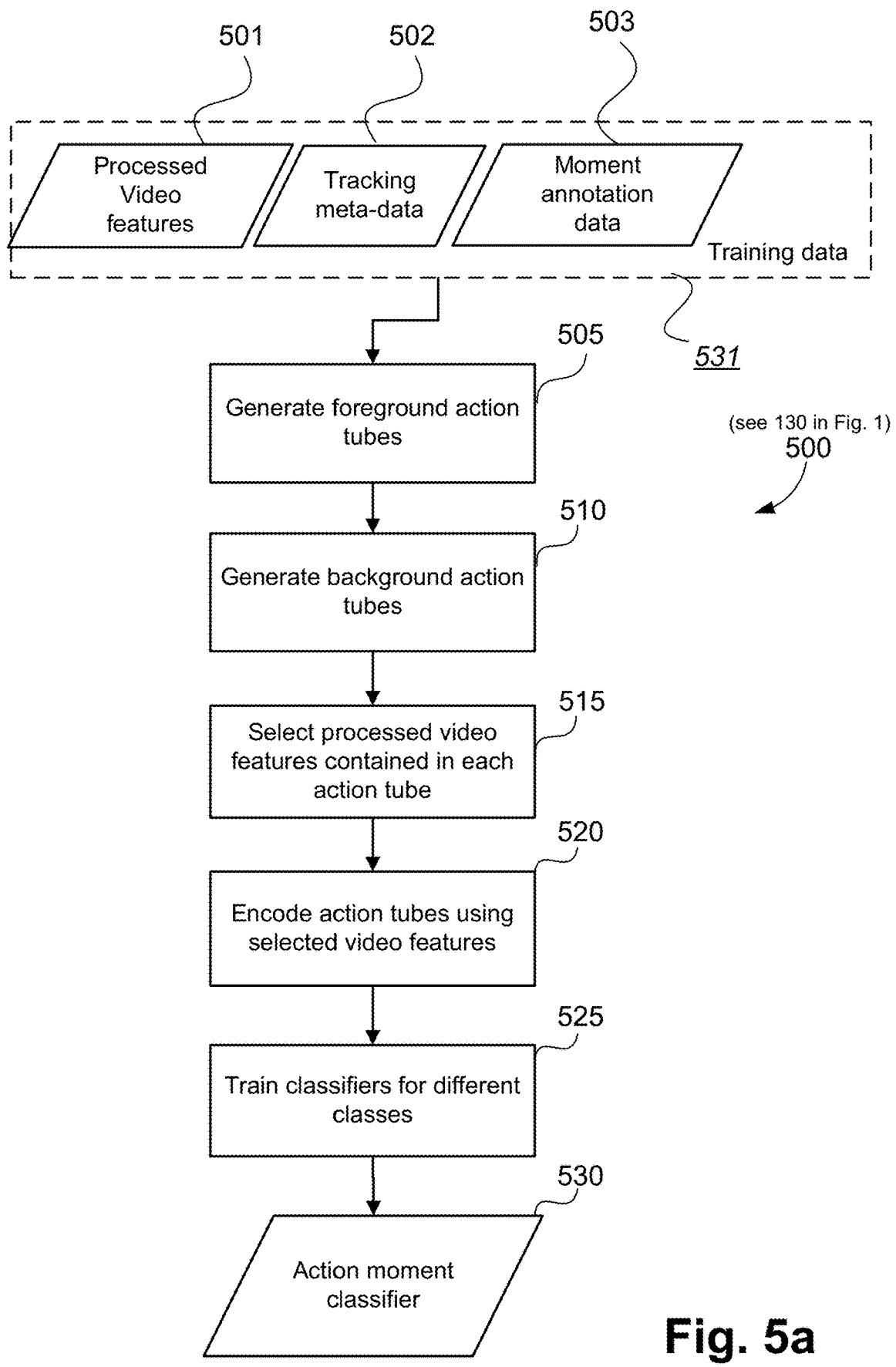
FIG. 5a is a schematic flow diagram illustrating a method of training action moment classifiers according to one embodiment of the invention.
Figure 5B:
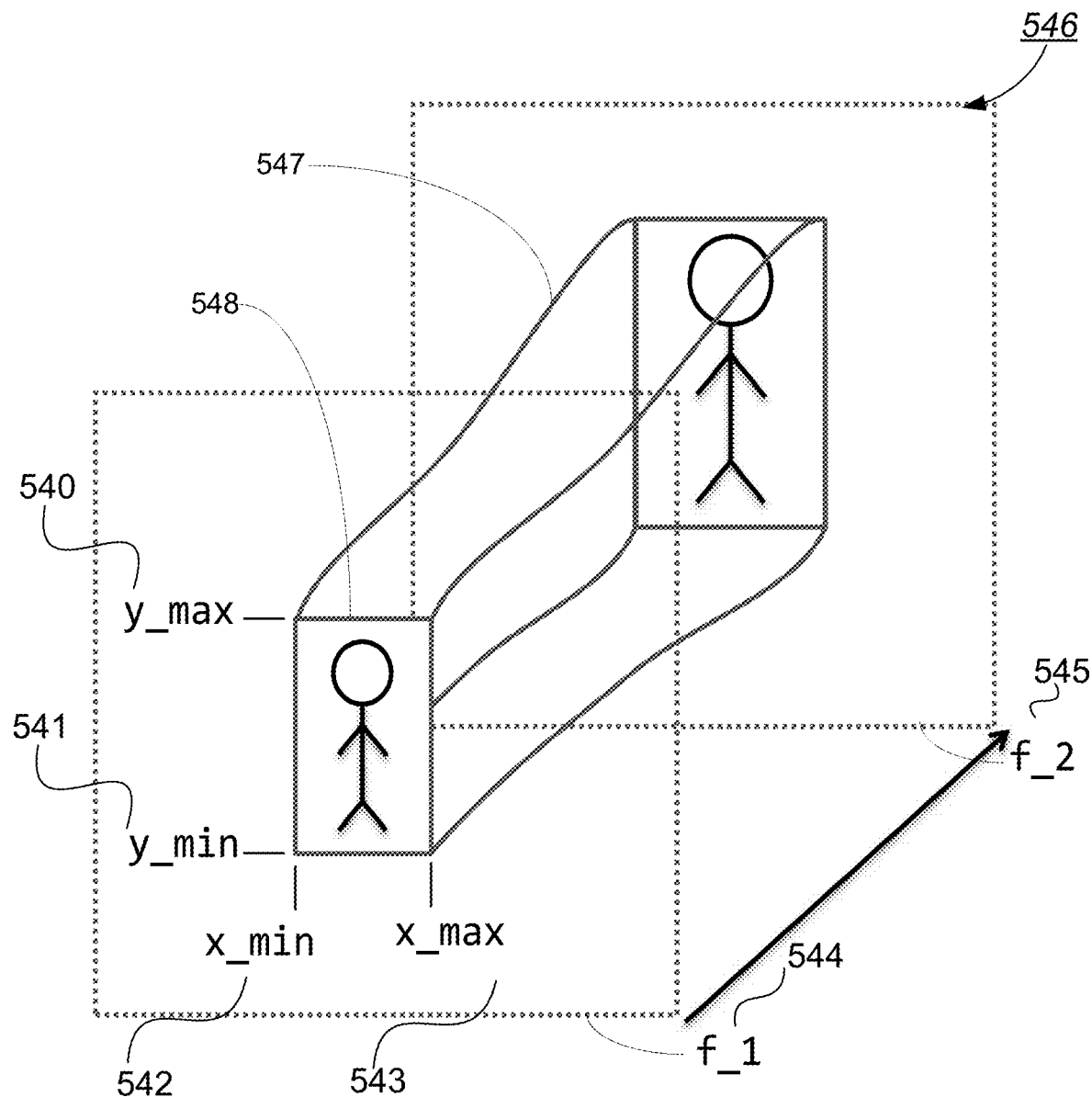
FIG. 5b is a visualisation of an action tube used in the method of FIG. 4.

After the action moments 131 are detected by the step 130, the action moments 131 are localized temporally (ie a temporal location of the action moments 131 is determined) to form localised action moments 132 in the form of action tubes, which are depicted in FIG. 5b. Each action tube specifies a starting point 544 and ending point 545 of the corresponding localized action moment 132. The step 130 then localises video segments to form localized video segments 133, where the localized video segments 133 are formed as per the localized action moments 132.

In one PSI arrangement all the localized action moments 132 are sorted temporally as per their starting frames. The localized video segments 133 are formed by grouping temporally adjacent action moments. For each formed localized video segment 133, a person whose action moment happens first is referred to as the play-agent, whereas a person whose action moment occurs later is referred to as the play-target. When a localized video segment 133 also includes a play object being passed between interacting people, the play object tracking output (described by play object information 320) from the step 120 may be used to further refine the play-agent and play-target identification process [1]35. The play state of each localised video segment 133 may be obtained by comparing the received play state information 111 at the step 110 with the temporal interval of the localised video segments.

Once the localized video segments 133 are determined at the step 130, the action detection method 100 is directed to a contextual feature extraction step 135. The step 135 is performed by the processor 1105 executing the PSI software program 1133, and is described hereinafter in more detail with reference to FIGS. 6a, 6b and 6c collectively (in regard to classifying play action using a probabilistic graphical model), and FIG. 7 (in regard to classifying interactions using rule based method). The step 135 extracts contextual features 141 from the play state information 111, the play object tracking information 320, and the player roles information. The player roles information 138 is internally generated by the step 135.

Firstly the step 135 checks if a localized video segment 133 is followed by a non-play localized video segment 133. This is dependent upon the observation that non-play segments convey a strong signal supporting detection of shoot-success actions, because a shoot-success is always followed by a non-play before the game resumes. A binary valued variable 136 is determined, this variable used to encode such information. For each localized video segment 133, the value of the variable 136 is set to 1 if the localized video segment 133 is followed by a non-play localized video segment 133 and 0 otherwise.

Secondly for each localized video segment 133 the step 135 determines (ie encodes) a location 137 of the play object described by 320 at the localized video segment-after-next. In particular, for each localized video segment 133, the location 137 of the play object described by 320 at the start moment of the localized video segment-after-next is determined and encoded. This is motivated by the observation that the play object location at the start moment of the localized video segment-after-next varies for different play action types occurring in the localized video segment.

Figure 8:
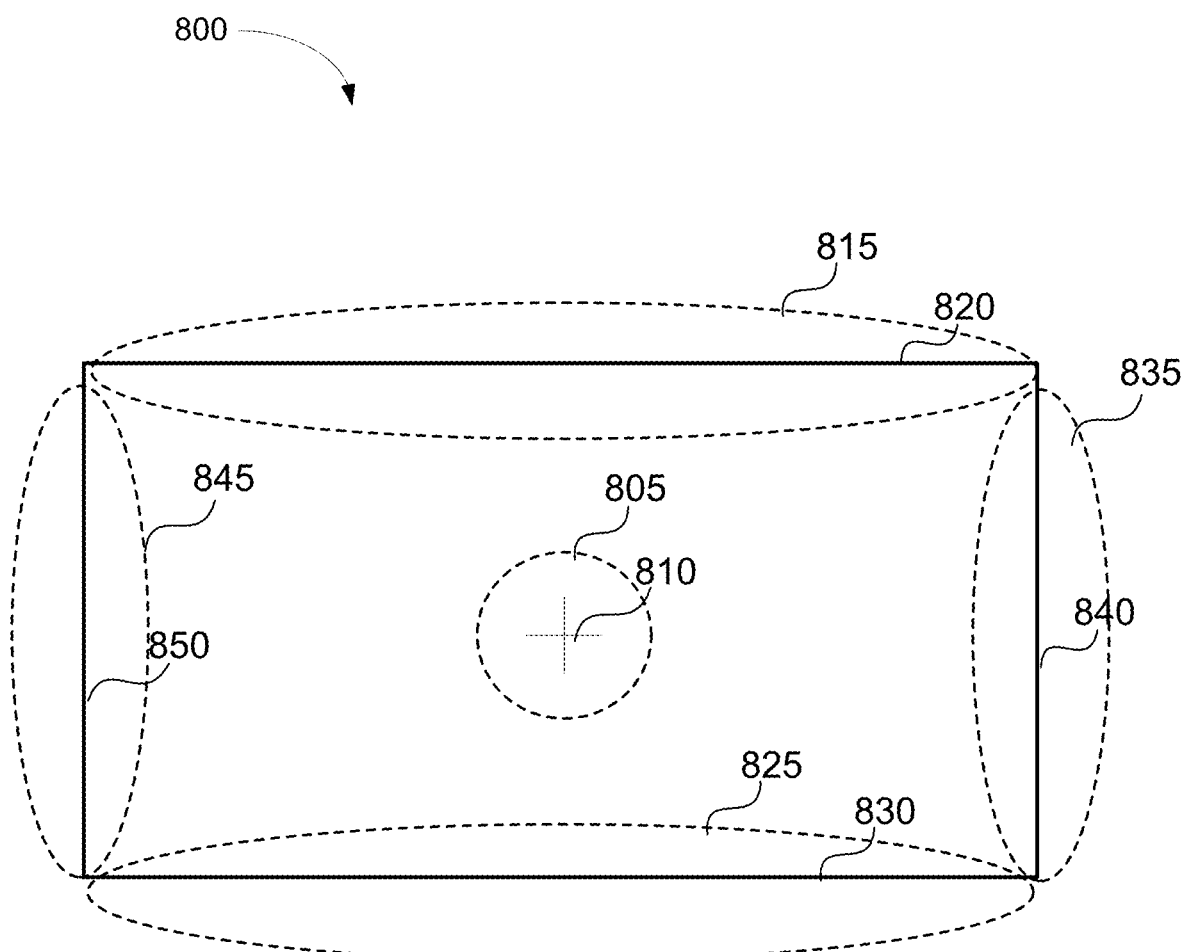
FIG. 8 is a visualization of an exemplary sports field for a ball sports game.

FIG. 8 is a visualization of an exemplary sports field for a ball sports game such as football. The following regions are considered:

(1) Region 1: a circular area 805 centred at the field centre 810 (the radius of the circular area is pre-defined). If a current localized video segment 133 is a shoot-success play, then it is likely that the play object described by 320 will start at Region 1 in the localized video segment-after-next;

(2) Region 2: areas 815, 825 around horizontal field borders 820, 830. If a current localized video segment 133 is a clearance play (the play-object is kicked out of field), then it is likely for the play object described by 320 will start at Region 2 in the localized video segment-after-next;

(3) Region 3: the areas 835, 845 around the vertical borders 840, 850 of the field. If the current localized video segment is a shoot-failure play (a failed shoot), then it is likely that the play object described by 320 will start at Region 3 in the localized video segment-after-next.

For each localized video segment 133, a vector of size 3 is used to encode the location 137 of the play object described by 320 at the localized video segment-after-next. The default value for the vector is [0, 0, 0]. If the play object starts in Region i (1≤i≤3) at the localized video segment-after-next, then the (i−1)-th bit is set to 1. Out of these three regions, Region 1 is a field centre region, while Region 2 and 3 are field boundary regions.

Lastly the step 135 considers the role of the player who manipulates the play object at the start moment of the localized video segment-after-next. The proposition is that, quite often a goalie would start the ball after a non-play following a shoot-failure. The step 135 determines a binary valued variable 138 to encode such information. For each localized video segment, if the ball is started by a goalie at the localized video segment-after-next, then the variable 138 it is set to 1 and 0 otherwise.

The roles 138 of the players are determined by the step 135 by applying classifiers trained on appearance features. For example, in sport games different teams often wear uniforms with different colours and logos. Players with special roles, such as goal-keepers or Libero (in volleyball), often wear a jersey of a different appearance. Appearance features such as colour histogram, histogram of gradients, and scale invariant feature transform (SIFT) feature can be extracted to train classifiers for different teams. In another PSI arrangement the roles 138 are estimated by applying classifiers trained on movement statistics. For instance, in soccer games, the movement of the goal keepers are often limited within a vicinity of the goal area. In this example movement statistics such as the mean values and the standard deviation values can be used to train classifiers that detect goal keepers.

The action detection method 100 proceeds to a play action classification step 140, performed by the processor 1105 executing the PSI software program 1133, (described hereinafter in more detail with reference to FIGS. 6c and 7). The step 140 classifies the play actions, to produce classified play actions 142, based on the recognised moment actions 139 and extracted contextual features 141 from play state information 111, play object tracking information 320 and player roles information 138, where the moment actions 139 are recognised in the action detection step 130, and the extracted contextual features 141 are determined at the contextual feature extraction step 135.

For example, when analysing the videos of soccer games, in order to detect a shoot-success play action, the action of the play-agent (e.g., kick) at the localised video segment, the play state of the segment-after-next, the location of the soccer ball at the segment-after-next (e.g., Region 1), and the role of the play-agent that starts the soccer ball (e.g. goalie) at the segment-after-next would be used.

Figure 6A:
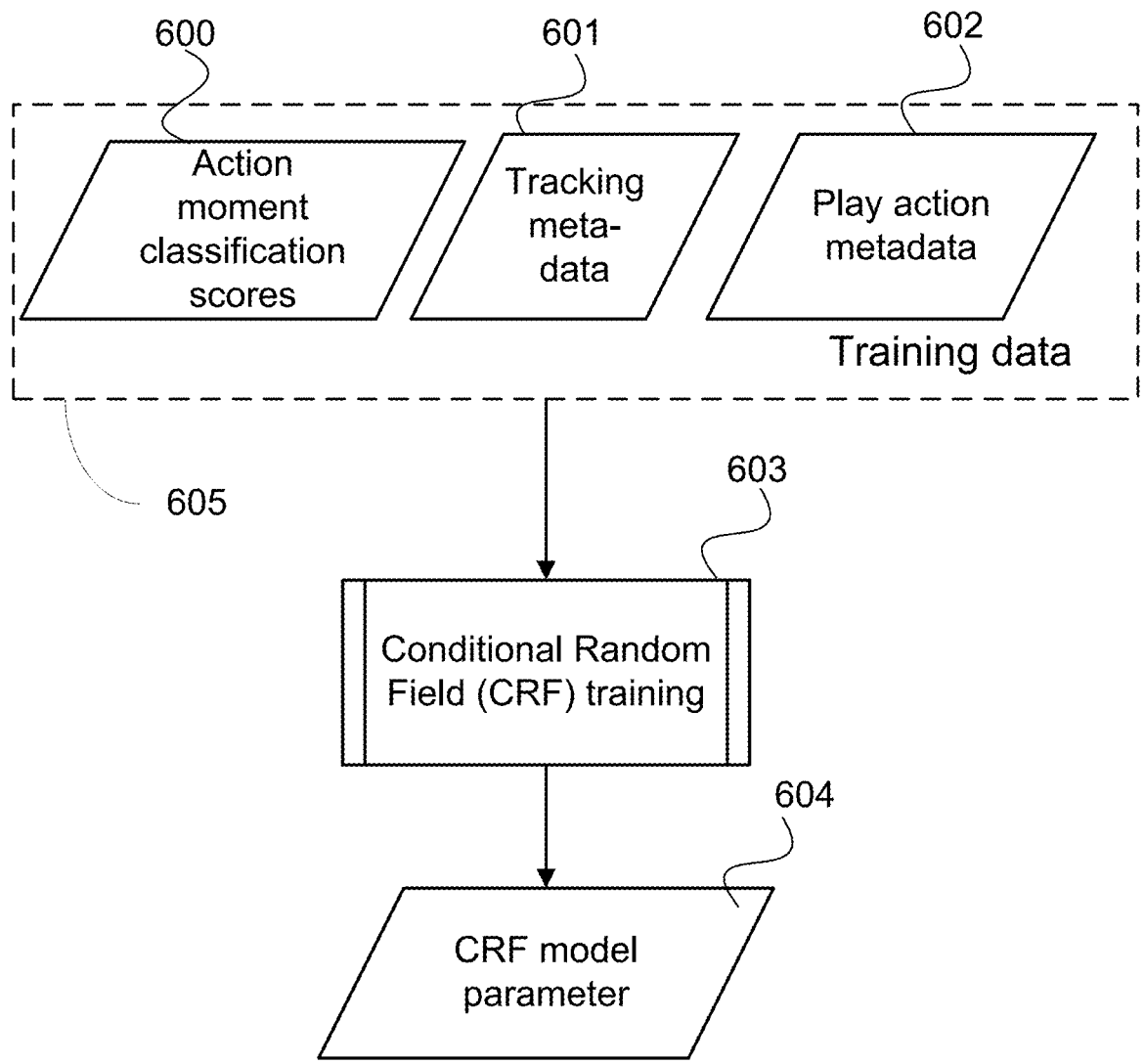
FIG. 6a is a data flow diagram illustrating a method of training a conditional random field model according to one embodiment of the invention.
Figure 6B:
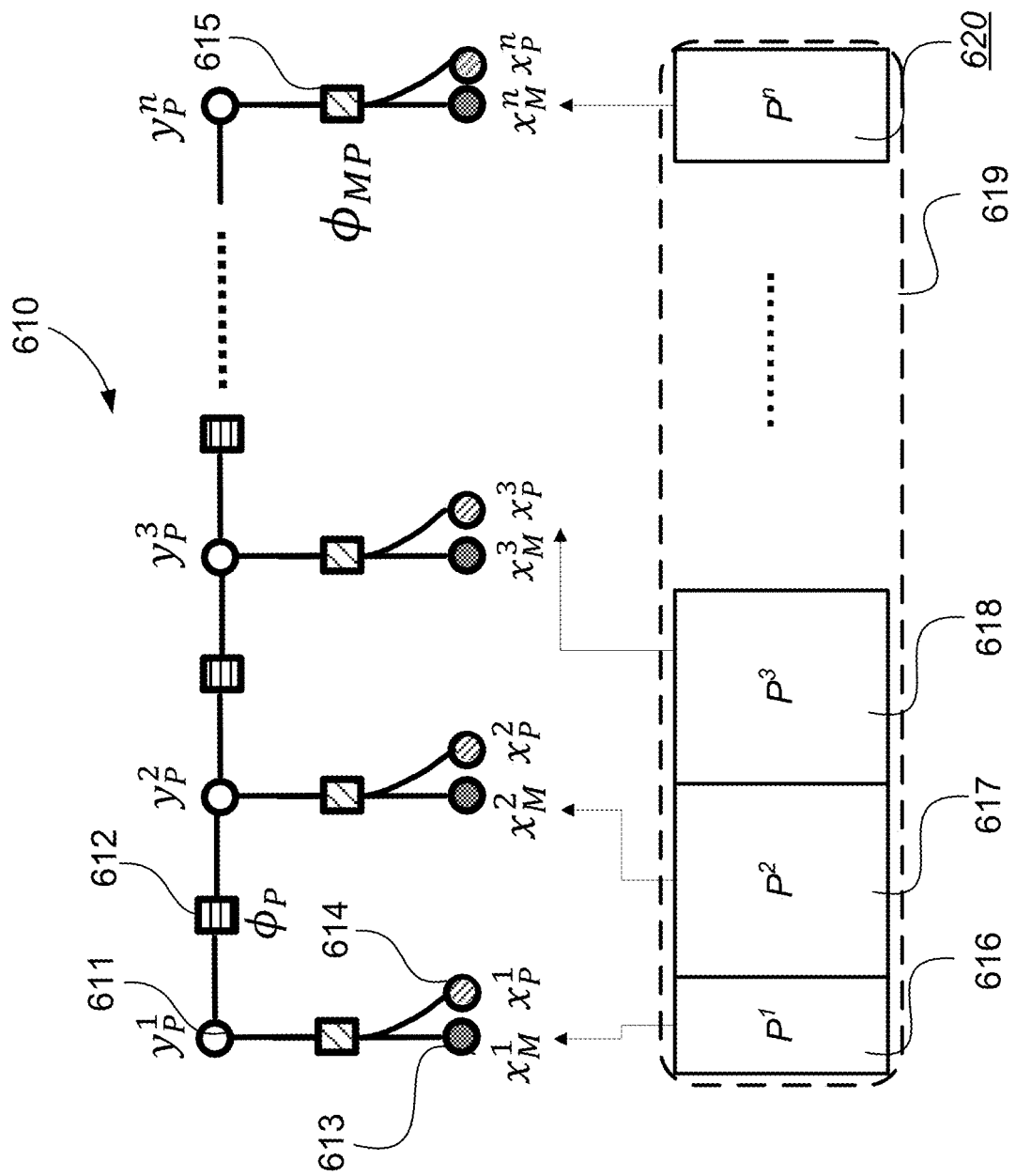
FIG. 6b is a visualisation of an exemplary graphical model for jointly classifying interactions with action moment scores and role information according to the present disclosure.
Figure 6C:
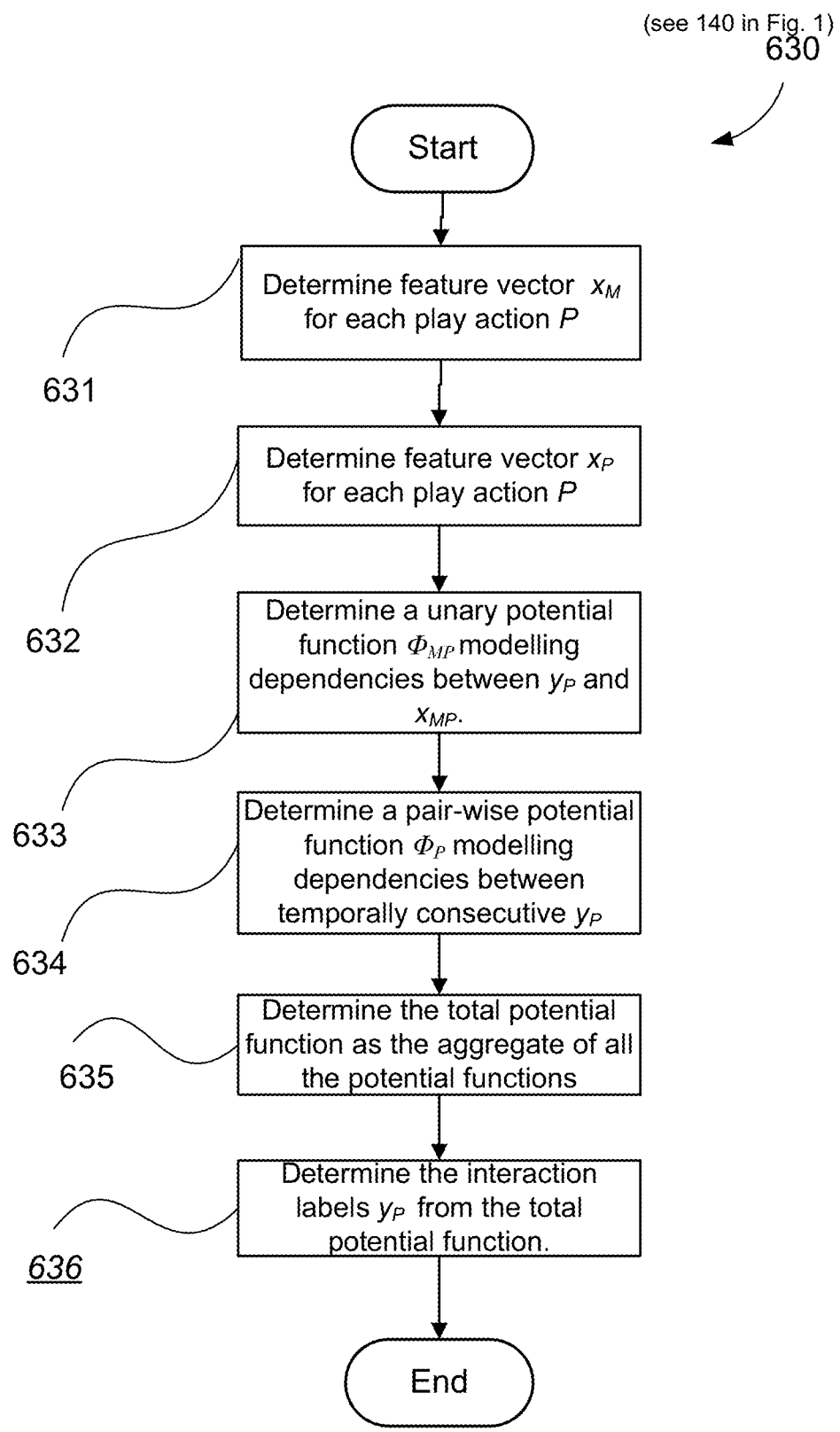
FIG. 6c is a schematic flow diagram illustrating a method of classifying actions based on recognised actions, play state and ball location information according to one embodiment of the invention.

A method of classifying play action using probabilistic graphical model is described hereafter with reference to FIGS. 6a, 6b and 6c collectively. Alternatively, a method of classifying interactions using rule based method is described hereafter with reference to FIG. 7.

Optionally the action detection method 100 proceeds to a play state reclassification step 145, performed by the processor 1105 executing the PSI software program 1133, which refines the play state information 111 which is obtained at the step 110, using the classified play actions 142 from the step 140.

Figure 10:
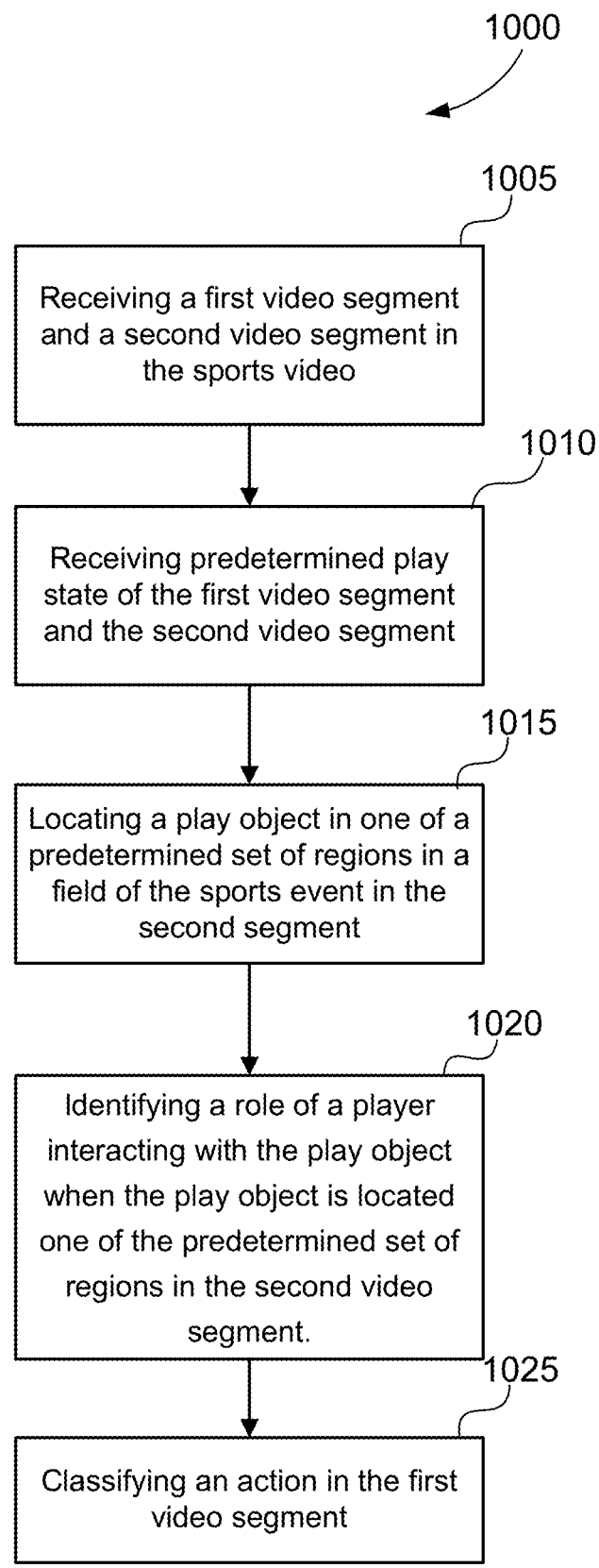
FIG. 10 is a schematic flow diagram illustrating a method of classifying actions based on recognised actions, play state and ball location information according to an embodiment of the invention, and shows FIG. 1 in more compact form.

FIG. 10 is a flow diagram showing the method 100 of FIG. 1 in more compact form. A step 1005, performed by the processor 1105 executing the PSI software program 1133, receives a first video segment and a second video segment in the sports video. A following step 1010, performed by the processor 1105 executing the PSI software program 1133, receives predetermined play state information 111 of the first video segment and the second video segment. The steps 1005 and 1010 correspond to the steps 110 to 130 in FIG. 1. A following step 1015, performed by the processor 1105 executing the PSI software program 1133, locates a play object defined by play object information 320 in one of a predetermined set of regions in a field of the sports event in the second segment. A following step 1020, performed by the processor 1105 executing the PSI software program 1133, identifies a role of a player specified by a player role variable 138 interacting with the play object specified by 320 when the play object is located in one of the predetermined set of regions in the second video segment. The steps 1015 and 1020 correspond to the step 135 in FIG. 1. A following step 1025, performed by the processor 1105 executing the PSI software program 1133, classifies an action to produce a classified action 142, in the first video segment, and this corresponds to the step 140 in FIG. 1.

Detect and Track Person

Figure 2:
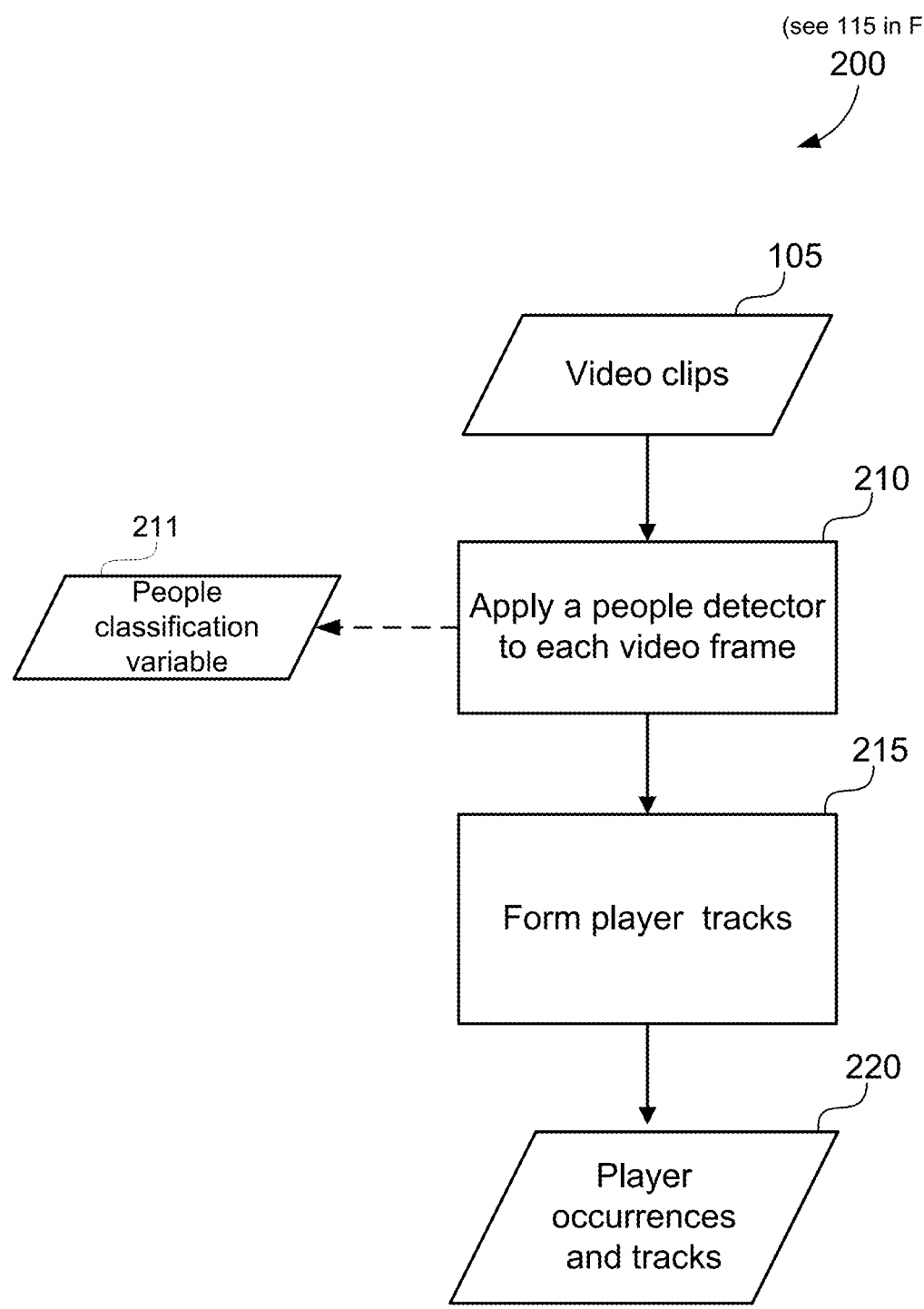
FIG. 2 is a schematic flow diagram illustrating a method of detecting and tracking players according to one embodiment of the invention.

FIG. 2 shows a flow chart for an example of a method 200 of detecting and tracking players, which can be executed at the people tracking step 115 in FIG. 1.

The people tracking method 200 accepts the video clips 105 as input, and a step 210, performed by the processor 1105 executing the PSI software program 1133, applies a people detector to each video frame. In one PSI arrangement, the people detector is trained by utilizing the Histograms of Oriented Gradients (HOG) descriptor and the Support Vector Machine (SVM) classifier. Such a people detector is named as HOG people detector. The HOG descriptor represents an entire person by a single feature vector. The HOG people detector uses a sliding window detection approach for detecting the occurrence of people in each video frame. At each detection window, a HOG descriptor is computed. This descriptor is then shown to the trained SVM classifier, which classifies the windows as either "people" or "not people", producing a people classification variable 211 which reflects the aforementioned classification of "people" or "not people". To detect people at different scales, each video frame is sub-sampled to produce multiple copies. The same HOG people detector can then be applied to each sub-sampled video frame. An alternative embodiment may use an object detector using deep convolutional neural networks. The people tracking method 200 is then directed to a track forming step 215, performed by the processor 1105 executing the PSI software program 1133, which forms tracks of people (this being part of the people information 220 in FIG. 1) who are detected at the step 210. In one embodiment, detected people at adjacent frames may be associated by comparing their appearance features such as HOG descriptors, or color histograms. For example, a distance measure such as Euclidean (L2) distance, histogram intersection distance, chi-square distance, etc. can be computed by comparing the HOG descriptors or colour histograms for people detected at frame $t_1$ and those detected at frame $t_2$. Two people are considered as the same person if the distance measure between their appearance features are lower than a empirically determined threshold. A track can then be formed by connecting the centres of matched people through all frames. A track reveals the movement of a people. A person skilled in the art, may use an alternative tracking algorithm in track forming step 215.

The track forming step 215 generates the set of people tracks 220 as output, where each track is ideally associated with the occurrences of a person in all frames. Often a track identifier (ID) is assigned to each generated track.

Detect and Track Ball

Figure 3:
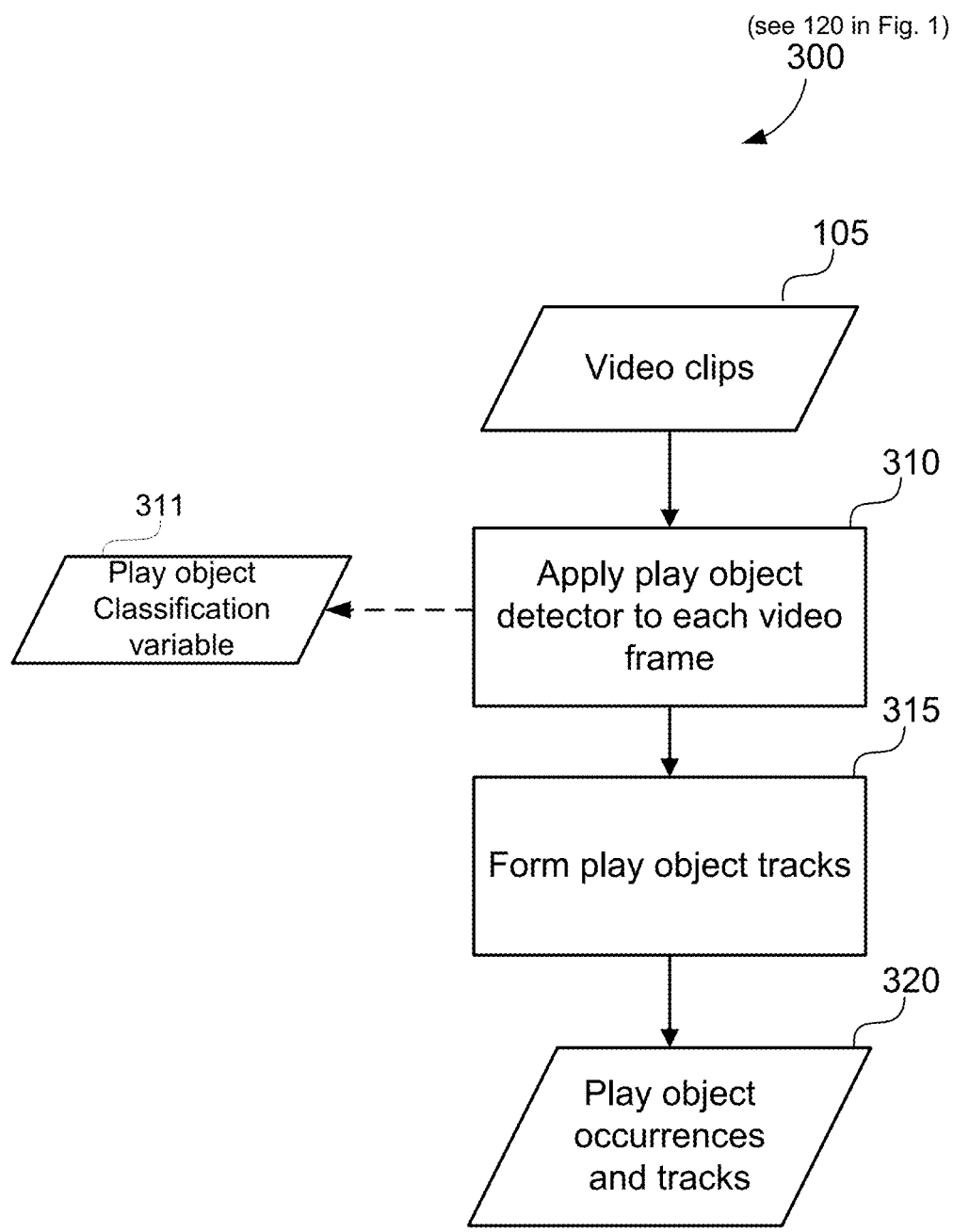
FIG. 3 is a schematic flow diagram illustrating a method of detecting and tracking the ball according to one embodiment of the invention.

FIG. 3 is a flow chart of an example of a method 300, performed by the processor 1105 executing the PSI software program 1133, of detecting and tracking ball in a ball sports game (or an alternative object of interest), as executed at the play object detection step 120 in FIG. 1.

The play object tracking method 300 accepts the video clips 105 as inputs, and applies a ball detector to each video frame at a step 310, performed by the processor 1105 executing the PSI software program 1133. In one embodiment, a play object detector is trained by utilizing the Scale Invariance Feature Transform (SIFT) descriptor and the Support Vector Machine (SVM) classifier. The SIFT descriptor captures the appearance feature of a play object. Similar to the people detector, the play object detector can detect the occurrence of the play object by a sliding window approach. At each detection window, a SIFT descriptor is computed. This descriptor is then shown to the trained SVM classifier, which classifies the windows as either "play object" or "not play object", producing a play object classification variable 311 which reflects the aforementioned classification of "play object" or "not play object".

The method 300 is directed to a following step 315, performed by the processor 1105 executing the PSI software program 1133, which forms the tracks 320 of the play object based on the detection result at the step 310. In one embodiment, the Kalman filter may be applied to track the movement of the ball based on the detection results.

At the end of the execution of the step 315, the method 300 returns the occurrences of the play object in all frames and the play object track 320.

Extract Video Feature

Figure 4:
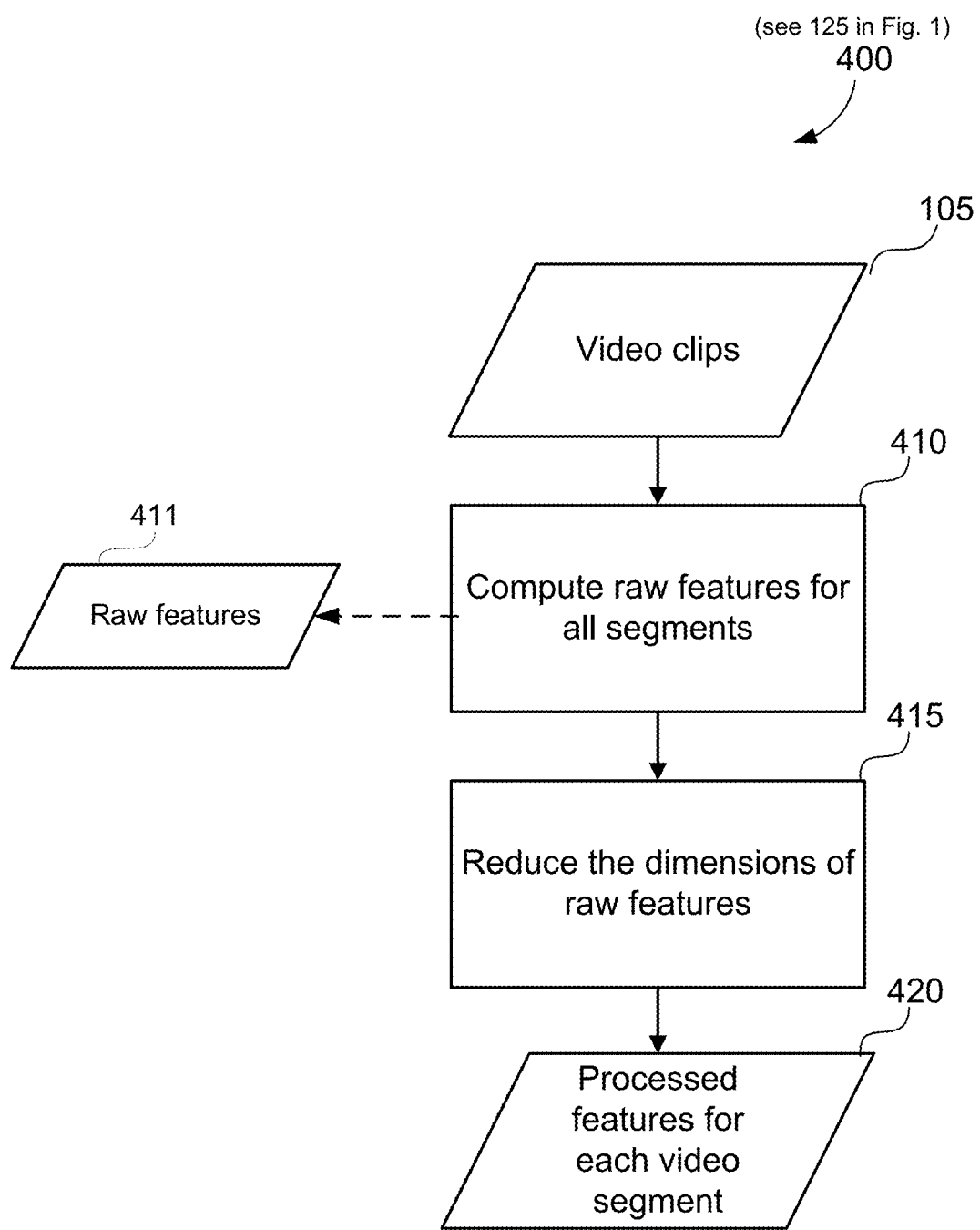
FIG. 4 is a schematic flow diagram illustrating a method of computing video features according to one embodiment of the invention.

FIG. 4 is a flow chart of an example of a method 400 of extracting video features, as executed at the video feature extraction step 125 in FIG. 1.

The input to the method 400 is the video clips 105. A feature calculation step 410, performed by the processor 1105 executing the PSI software program 1133, loads the video clips and determines raw features 411 for each video, where a raw feature is a piece of information that describes certain characteristics of the video. In one embodiment, Improved Dense Trajectory (iDT) features are chosen as the raw features (as shown in Table 1). The Improved Dense Trajectory feature descriptor is a hand-crafted descriptors for action in videos. Trajectories are formed by tracking points using median filtering in a dense optical flow field. For each trajectory, multiple descriptors such as trajectory descriptor, Histogram of gradient (HOG), Histogram of optical flow (HOF), and Motion boundary histogram (MBH) descriptors are computed and concatenated to form the Improved Dense Trajectory feature descriptor. In particular, an Improved Dense Trajectory feature contains properties as shown in the following Table 1:

TABLE 1 iDT feature descriptor properties.

| Property name | Description |
|---|---|
| frameNum | The trajectory ends on which frame |
| mean_x | The mean value of the x coordinates of the trajectory |
| mean_y | The mean value of the y coordinates of the trajectory |
| var_x | The variance of the x coordinates of the trajectory |
| var_y | The variance of the y coordinates of the trajectory |
| length | The length of the trajectory |
| scale | The trajectory is computed on which scale |
| x_pos | The normalized x position w.r.t. the video (0~0.999) |
| y_pos | The normalized y position w.r.t. the video (0~0.999) |
| t_pos | The normalized t position w.r.t. the video (0~0.999) |
| Trajectory | 2×trajectory length (default 30) |
| HOG | 8×spatial cells×spatial cells×temporal cells (default 96) |
| HOF | 9×spatial cells×spatial cells×temporal cells (default 108) |
| MBHx | 8×spatial cells×spatial cells×temporal cells (default 96) |
| MBHy | 8×spatial cells×spatial cells×temporal cells (default 96) |

An alternative embodiment may use features extracted using a convolutional neural network trained for detecting actions of interest.

In one embodiment, the feature calculation method 400 progresses to a dimension reduction step 415, where the dimensions of the raw video features 411 are reduced. In one embodiment, the dimension reduction is conducted by Principle Component Analysis (PCA). PCA is a statistical procedure that uses an orthogonal transformation to convert a set of observations of possibly correlated variables into a set of values of linearly uncorrelated variables named principal components. The dimension reduction step 415 is an optional step which can be used to reduce computational cost of action detection. However, when the features calculated in the feature calculation step 410 are high dimensional (such as Improved Dense Trajectory iDT features) using dimension reduction step 415 is recommended. When dimension reduction is conducted using a de-correlating method such as PCA, the recognition accuracy may also improve due to the de-correlating effect of PCA transform.

The feature calculation method 400 returns with the set of processed low level video features 420 for each video segment.

Extract Action Moments

Figure 5C:
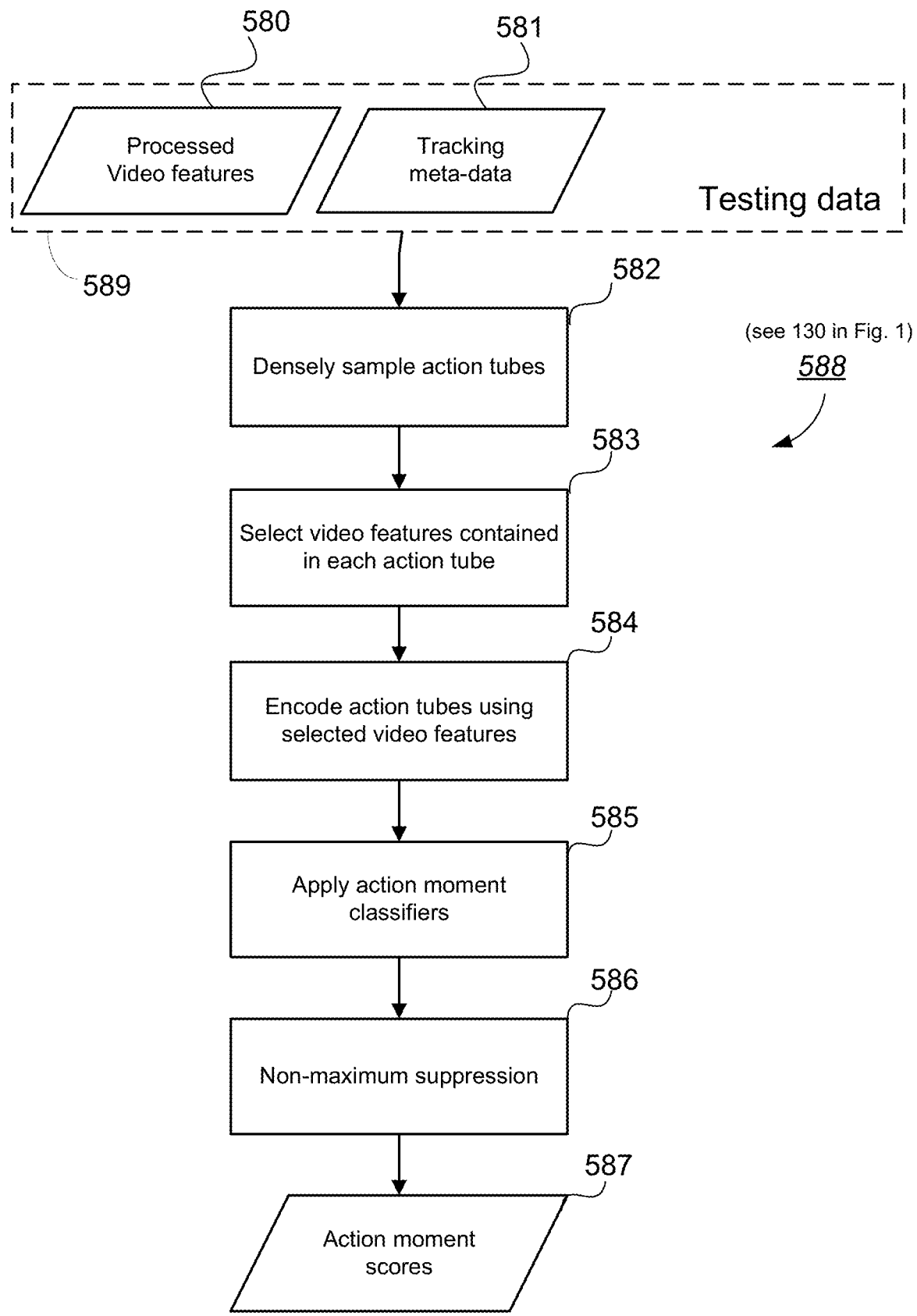
FIG. 5c is a schematic flow diagram illustrating a method of detecting action moments according to one embodiment of the invention.

FIGS. 5a, 5b and 5c collectively depict an example of a method for detecting action moments, as executed at the action moment detection step 130 in FIG. 1.

In one embodiment, action moment detection is achieved by applying trained action moment classifiers to the extracted video features 420 and the tracking data 220.

FIG. 5a is a flow chart of an example of a method 500 for implementing training action moment classifiers, as used in the step 130 in FIG. 1.

The input to the method 500 consists of a training data set 531 comprising processed video features 501 (see 420) outputted by the video features extraction method described with respect to FIG. 4, and for the video sequences in the training set 531, the data set 531 also includes tracking metadata 502 (players and play object tracking data generated by method 115 and 120 of FIG. 1) and moment annotation data 503.

At training, the tracking metadata 502 can be generated by tracking people using the people tracking method 200 as used in the people tracking step 115, or be provided as part of the training data, for example by manually tracking people using a software tool. The moment annotation data 503 may contain the starting frame, ending frame, people id (for example in the form of associated track id), and action moment label for each action moment.

The action moment classifier training method 500 starts with a foreground action tube forming step 505, performed by the processor 1105 executing the PSI software program 1133, which generates foreground action tubes (described hereinafter in more detail with reference to FIG. 5b) using the moment annotation data 503.

An action tube is formed for a tracked player based on player tracking data generated by module 115. FIG. 5b depicts a foreground action tube 547 which contains an instance of an action of interest, and is specified by a frame range which includes a starting frame 544, and an ending frame 545, and a spatial extent for each frame inside the tube, which is given by a bounding box (548) specified by the top-left 542, 540, and bottom-right 543, 541 corners over this frame range for a given tracked player. For every annotated moment that maps to an action moment label, an action tube is created with a predefined number of frames, for example 25 frames.

The action moment classifier training method 500 is then directed to a following background action tube forming step 510, performed by the processor 1105 executing the PSI software program 1133, which generates background action tubes using the moment annotation data 503. A background action tube contains no action of interest. In one embodiment background action tubes are generated by randomly selecting an action tube which does not temporally overlap with any of the foreground action tubes generated in foreground action tube forming step 505. Next, the action moment classifier training method 500 progresses to a feature selection step 515, performed by the processor 1105 executing the PSI software program 1133, where for each action tube produced at foreground action tube forming step 505 and background action tube forming 510, the subset of processed video features 501 (see 420) contained in the determined action tube are selected for the purpose of describing the action tube. In this step, each processed video feature (for example each calculated Improved Dense Trajectory feature vector) is assigned either to a corresponding action tube with a temporal and spatial match or is discarded if no matching action tube is found. The matching can be done based on the ending frame number of the Improved Dense Trajectory feature and the frame number range of the action tube as well as the mean x and y position of the Improved Dense Trajectory feature.

The action moment classifier training method 500 is now directed to a following feature encoding step 520, performed by the processor 1105 executing the PSI software program 1133, which associates each action tube with a variable number of Improved Dense Trajectory features contained within it. The feature encoding step 520 forms a single encoding vector for each action tube from the statistics of the associated video features. In one embodiment, Fisher vector encoding may be employed to encode the features, which means that each action tube is encoded by a Fisher vector. An alternative embodiment may use Vector of Locally Aggregated Descriptors (VLAD) encoding to encode the features.

Once all the action tubes have been encoded, each action tube is then described by a single encoding vector which encodes all the associated video features.

The method 500 then is directed to a classifier training step 525, performed by the processor 1105 executing the PSI software program 1133, which trains action moment classifiers to classify actions contained in the spatio-temporal action tubes based on their encoding vectors. A multi-class linear SVM may be employed with the Fisher-vectors that have been encoded for each action tube (at the step 520 action moment classifier training) and a corresponding action label (for the action contained in the action tube). At training time, each action tube (either foreground or background) m (m∈0, . . . , $N_{AT}$) ($N_{AT}$ stands for the total number of action tubes) in the training set has a single Fisher vector $F_m$ and a corresponding target action class $y_m$ ($y_m \in 0, \ldots, N_C$) ($N_C$ stands for the total number of different action classes). In one embodiment, the classifier is trained using one-versus-rest (OVR) multi-class classification, where $N_C$ binary classifiers are trained to discriminate each class separately against all other classes. An alternative embodiment may use pair-wise multi-class SVM classifiers, or multinomial logistic regression (also known as Softmax) classifiers. A softmax classifier provides the likelihood of all possible action classes for an input action tube such that the likelihoods represent a probability distribution over the possible $N_C$ action classes.

At the end of the action moment classifier training method 500, the multi-class classifier trained in the classifier training step 525 is returned as the action moment classifier 530 (which is used in the method 585 in FIG. 5c).

FIG. 5c is a flow chart for an example of an action moment detection method 588 of applying the action moment classifiers 530, as executed in the step 130 in FIG. 1.

Input testing data 589 for the action moment detection method 588 includes the processed video features 580 (see 420) extracted at the video feature extraction step 125, the tracking metadata 581 determined at the people tracking step 115, and optionally play object information 320 determined at the play object tracking step 120.

The action moment detection method 588 starts with an action tube forming step 582, performed by the processor 1105 executing the PSI software program 1133, which densely samples a set of action tubes from the range of the testing video. For testing videos with multiple views, videos from every view will be sampled to produce action tubes from each view.

A subsequent feature selection step 583, performed by the processor 1105 executing the PSI software program 1133, selects the processed video feature 580 associated with each selected action tube using a similar method to that employed in the step 515 in FIG. 5a. A subsequent feature encoding step 584, encodes the selected video features for each action tube as a single feature vector using a similar method to that used in the step 520 in FIG. 5a. A subsequent action moment classification step 585, performed by the processor 1105 executing the PSI software program 1133, applies the trained action classifiers 530 from the step 525 at FIG. 5a to each action tube to obtain action classification scores 587.

By the end of the step 585 the action classification scores are available for all action tubes. In order to determine the temporal location (localise) of the actions (see 132 in FIG. 1), non-maximum suppression is applied at a following step 586, performed by the processor 1105 executing the PSI software program 1133.

Figure 5D:
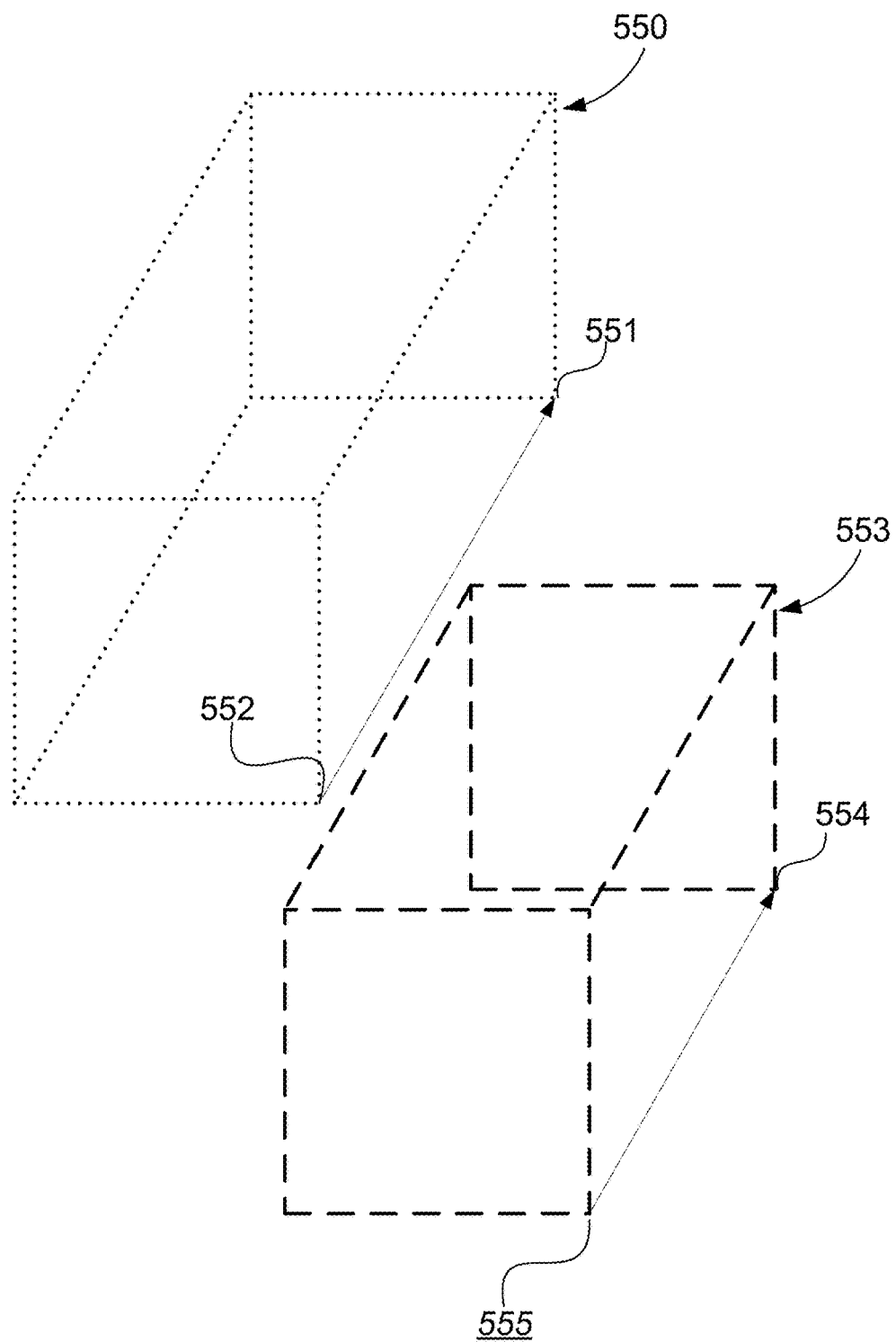
FIG. 5d is a schematic flow diagram illustrating the temporal intersection of two action tubes used in the method of FIG. 4.

For videos with multiple views, the action moment classification scores for the multiple views are consolidated into a single classification score for each action tube. Methods for consolidating the scores from multiple views include, but are not limited to, averaging scores from all views and taking the maximum score of all views. The non-maximum suppression method of 586 is a locally greedy algorithm which localises the actions of interest by greedily selecting action tubes with the maximum score in a local spatio-temporal neighbourhood and suppressing the selection of other action tubes within this local spatio-temporal neighbourhood. The local spatio-temporal neighbourhood can be defined using measures such as a temporal overlap (i.e., temporal intersection over union), a fixed temporal window, or spatio-temporal intersection over union. For example, FIG. 5d depicts two action tubes, namely 550 and 553. The action tube 550 has a temporal duration defined by a start frame 552 and an end frame 551. Similarly, the action tube 553 is defined by frames 555 and 554 temporally. The action tubes 550 and 553 have overlaps. The temporal union of these two action tubes is defined by the interval starting at a frame min(552, 555), and ends at frame max(551, 554), where min(.,.) returns the minimum of the given two frames (ie the frame with the smallest frame number) and max(.,.) returns the maximum of the given two frames (i.e. the frame with the largest frame number). The temporal intersection of the two action tubes 550 and 553 is defined by the interval starting at frame max(552, 555), and ending at frame min (551, 554).

Often a fixed overlap temporal window of half-width T frames is used in the non-maximum suppression step 586 and all score with time within T frames of a selected local maximum is suppressed. In one embodiment, T=16 frames is used. The action moment detection method 5c returns the scores 587 of all views at the step 586.

Figure 5E:
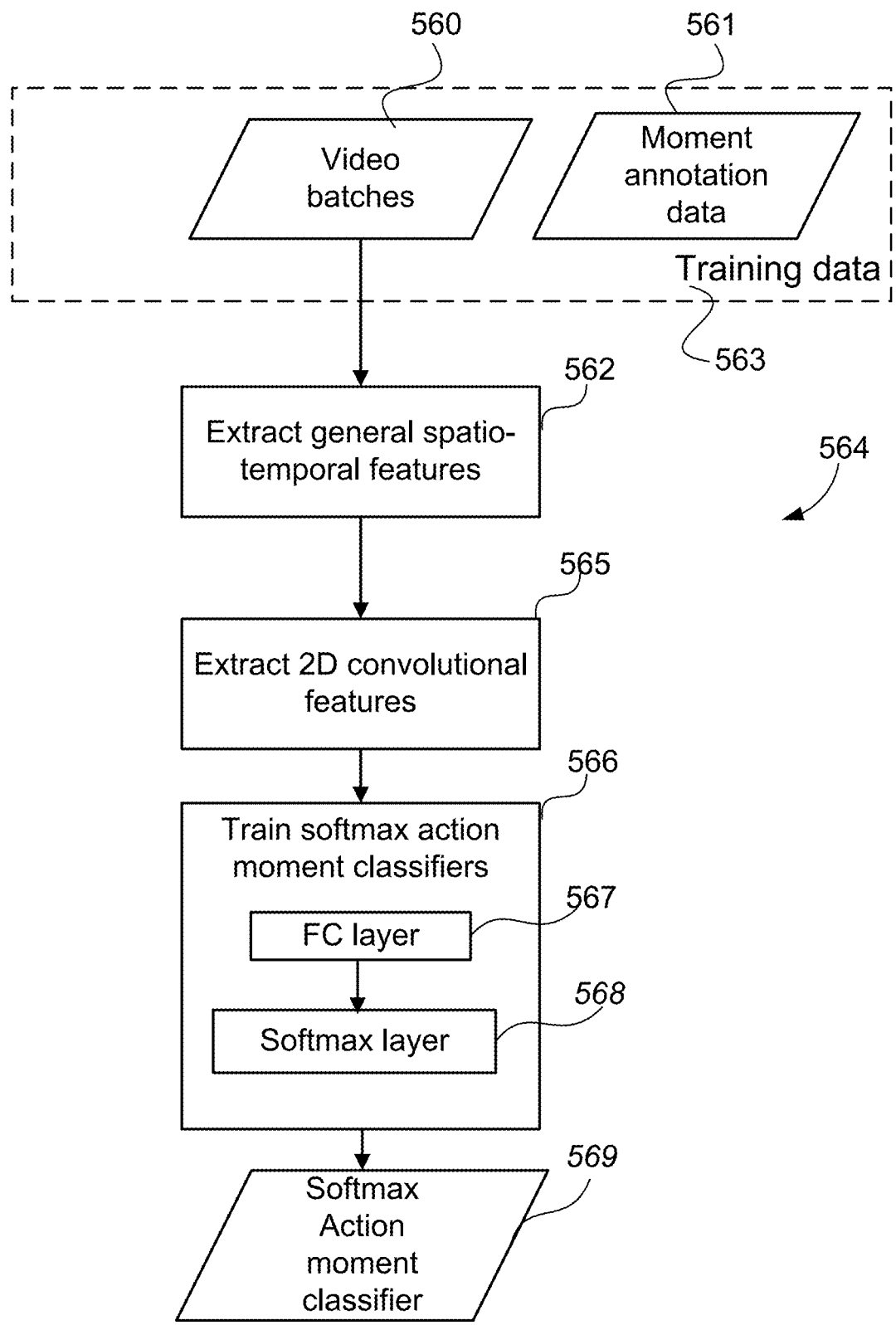
FIG. 5e is a schematic flow diagram illustrating a method of training softmax action moment classifiers according to one embodiment of the invention.

FIG. 5e is a flow chart for an example of a method 564 for implementing an alternative embodiment (ie training a softmax action moment classifiers) in which the action moment classification scores 587 are be obtained via a deep learning based approach, as used in the step 130 in FIG. 1.

The input training data 563 to the method 564 includes raw video batches 560 and moment annotation data 561. The method may also use tracking data to get better action moment scores. Each video batch 560 contains a series of consecutive video segments. To ensure the accuracy of the softmax classifiers, a predefined mini-batch size may be imposed. In one embodiment, a preferred mini-batch size of 20 video batches is used. Each video segment contains the raw pixel values of the inputted video in LAB colour-space, which may be converted from the values in the RGB colour-space. The main purpose of using LAB colour-space instead of RGB, is that it allows the luminance channel to be processed separately from the chrominance channels, reducing the memory requirement. The moment annotation data 561 may contain the starting frame, ending frame, people id (for example in the form of associated track id), and action moment label for each action moment associated with the segments in the video hatch 560.

The softmax classifier training method 564 is directed to a general spatio-temporal feature extraction step 562, performed by the processor 1105 executing the PSI software program 1133, which extracts spatial-frequency and motion velocity information from each video segment from the batch 560. Specifically, each spatial frequency feature produces a response for a given input channel, a spatial scale and an orientation, for each pixel position. This acts as a band-pass filter for the given spatial-frequency component. Each filter is defined using a sine wave, symmetric about the centre. In the filter 48 spatial-frequency features may be used, representing 6 spatial scales (width=3 to 33, step 6), 4 orientations (0 to $\pi$, step $\pi/4$), and 2 inversions. Each filter response is calculated for each input channel, producing 144 response channels for 3 input channels, using a rectified-linear unit (ReLU) non-linearity. Each motion feature is determined from the spatial-frequency feature responses from a pair of frames, and produces a response representing the motion component for a particular motion direction and velocity. In the filters 48 motion features may be used, representing 8 directions (0 to $2\pi$, step $\pi/4$), and 6 displacement scales (1 to 19, step 3). The 144 spatial-frequency channels are concatenated with the 48 motion-response channels, providing input of 192 channels to the higher layers of the neural network. The softmax moment classifier training method 564 is then directed to a following 2D convolutional feature extraction step 565, performed by the processor 1105 executing the PSI software program 1133. In particular, a series of 2D convolution operations are applied to the inputted 192 channels of data outputted at the step 562. The dimension of the 2D convolution operators and their outputs are summarised in Table 2 below:

TABLE 2

| Layer type | Num kernels | Kernel size | Pad | Pool | Stride | Output shape |
| --- | --- | --- | --- | --- | --- | --- |
| 2D Conv | 196 | 3 × 3 | 1 × 1 | 2 × 2 | 1 × 1 | (18, 196, 29, 22, 24) |
| 2D Conv | 256 | 3 × 3 | 1 × 1 |  | 1 × 1 | (18, 256, 29, 22, 24) |
| 2D Conv | 256 | 3 × 3 | 1 × 1 | 2 × 2 | 1 × 1 | (18, 256, 15, 11, 24) |
| 2D Conv | 512 | 3 × 3 | 1 × 1 |  | 1 × 1 | (18, 512, 15, 11, 24) |
| 2D Conv | 512 | 3 × 3 | 1 × 1 | 2 × 2 | 1 × 1 | (18, 512, 8, 6, 24) |
| 2D Conv | 512 | 3 × 3 | 1 × 1 |  | 1 × 1 | (18, 512, 8, 6, 24) |
| 2D Conv | 512 | 3 × 3 | 1 × 1 | 2 × 2 | 1 × 1 | (18, 512, 4, 3, 24) |

Then the softmax moment classifier training method 564 proceeds to the step of training softmax action moment classifiers 566, wherein the output of the 2D convolution layer 565 are connected to a fully connected layer 567 before being fed into the softmax classification layer 568. The softmax classifiers are trained using the back-propagation algorithm. The output of the training step 566 consists of a softmax classifier 569. The softmax classifier provides the likelihood of the i-th segment being in the j-th moment class).

Figure 5F:
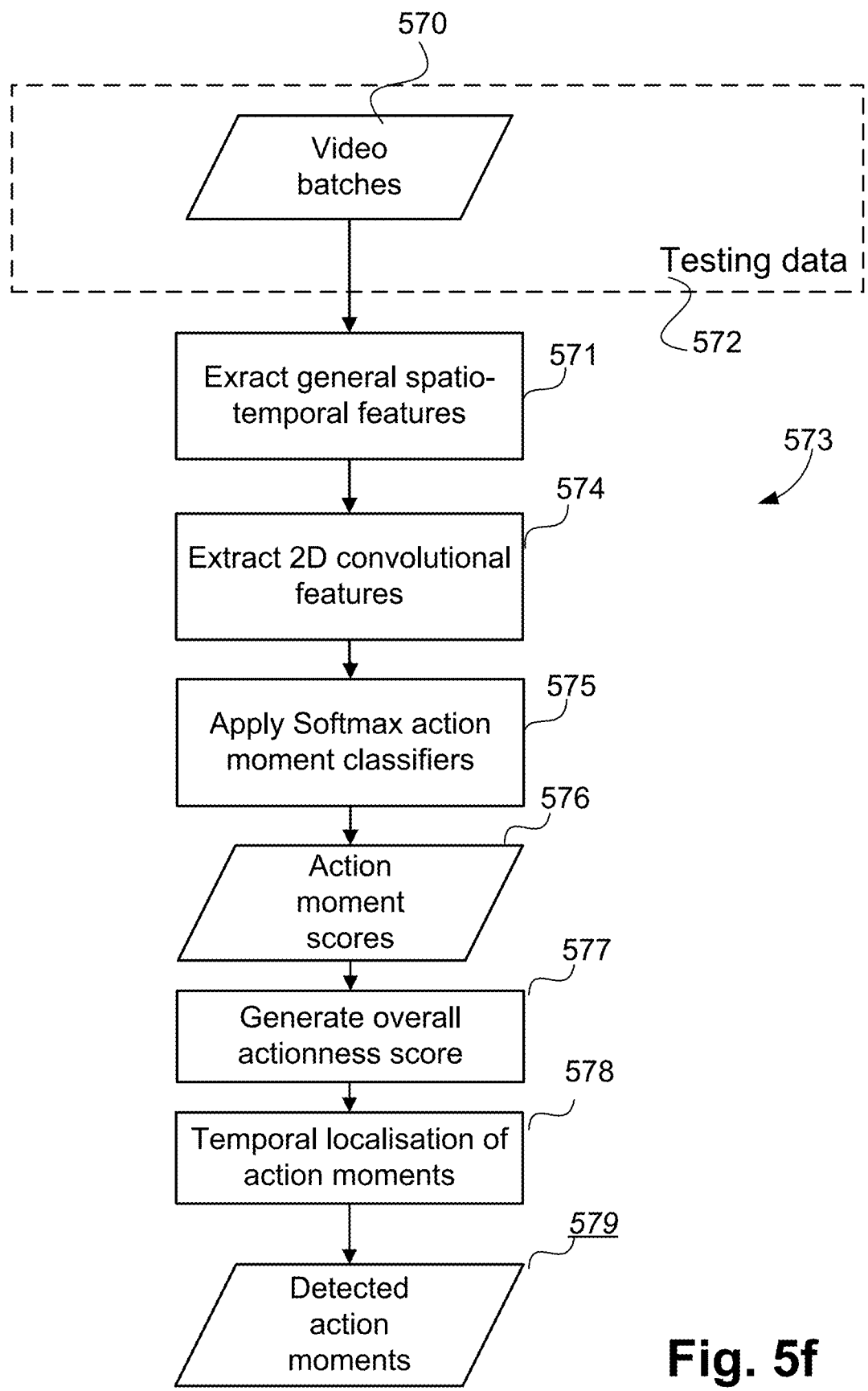
FIG. 5f is a schematic flow diagram illustrating a method of detecting action moments according to one embodiment of the invention.

FIG. 5f is a flow chart of an example of an action moment detection method 573 of applying the trained softmax action moment classifiers 569, as executed in the step 130 in FIG. 1.

Input testing data 572 to the action moment detection method 573 consists of raw video batches 570. Each video batch 570 contains a series of consecutive video segments 133. Similar to the method 564 in FIG. 5e the detection method 573 extracts general spatio-temporal and 2D convolution features from the given video batches 570 at steps 571, and 574, respectively performed by the processor 1105 executing the PSI software program 1133. Once the features are extracted, the method 573 is directed to a following step 575, performed by the processor 1105 executing the PSI software program 1133, which applies the trained Softmax classifier 566 from the method 564 in FIG. 5e to the extracted features to output the action moment classification scores 576 for each segment inside the video batches.

To temporally localise the action moments, the maximum of action moment classification scores 576 for all action classes of interest at each time-stamp is used as the overall actionness score in step 577.

Next in the temporal localisation step 578, the time localization of action moments are determined by finding the peaks in the overall actionness scores. Often a predefined threshold (for example a threshold of 0.5) is used and any time-stamp with overall actionness score smaller than the predefined threshold is ignored. In one arrangement, the temporal locations of the peaks (i.e., detected action moments 579) are determined using a non-maximal suppression algorithm (NMS). The non-maximal suppression algorithm is a greedy algorithm and localises the peaks by sorting the actionness scores in descending order. For every selected maxima, the scores from time-stamps closer than a predefined temporal radius (for example 7 timestamps) are ignored for the purpose of finding the next peaks. An alternative arrangement may use dynamic programming to globally optimise for the location of the peaks in the action scores.

Classify Play Actions Embodiment I

FIGS. 6a, 6b and 6c collectively depict one embodiment of classifying play actions based on recognised moment actions, extracted features from play state, play object tracking, and player role information, as executed at the play action classifying step 140 in FIG. 1.

FIG. 6a is a data flow diagram illustrating a method of training a conditional random field (CRF) model for classifying interactions.

In one embodiment training data 605 for the CRF model consists of action moment classification scores 600 obtained from the action moment classification step 585 in FIG. 5c, player and ball tracking metadata 601 (from 220 and 320 respectively), and play action metadata 602. The tracking metadata 601 is obtained from the execution of people and ball tracking methods 200 and 300 respectively. The play action metadata 602 contains ground truth labels for each play action in the video; it also contains information about the corresponding action moments for each play action.

The aforementioned information may be used as a lookup table to retrieve corresponding action moment classification scores for each play action. In one embodiment, action moment classification scores are computed for action moments defined by ground truth from the training set 605. Specifically, the temporal information (start and end frames) for each action moment is obtained from the ground truth. In an alternative embodiment, action moment classification scores are computed on action moments obtained by applying the method 588 on the training video set. Specifically the temporal information for each action moment from the training set is derived by method 588. The set of CRF model parameters 604 is obtained from the step of Conditional random field learning 603 performed by the processor 1105 executing the PSI software program 1133, based on the given training data 605. A method of CRF model training, as executed at CRF training step 603, is described hereafter with reference to FIG. 6c.

FIG. 6b is a visualisation of a chain-structured conditional random field model for classifying play actions with action moment scores, play state, play object location and player role information, as used in the play action detection embodiment using CRF. In the visualization of the CRF model shown in FIG. 6b, empty circles ($y''_p$) indicate output variables, and filled circles ($x''_m$, $x''_P$) represent input variables. Filled squares ($\phi_{MP}$, $\phi_P$) represent potential functions for which the parameters are learned using the training data. A potential function in a CRF stands for a function of a subset of all input variables. The training data represents a sequence of play actions which contains play actions $P^1$ (ie 616), $P^2$ (ie 617), $P^3$ (ie 618), ..., $P^n$ (ie 620). Each play action contains both the starting and ending action moments.

The depicted CRF models the conditional distribution between the classes of action moment and interaction by the following equations (1) and (2):

$$P(Y \mid X) = \frac{1}{Z(X)} \exp(-E(X, Y; W)) \quad (1)$$

Where, $$Z(X) = \sum_y \exp(-E(X, Y; W)) \quad (2)$$

$$E(X, Y; W) = E(y_p^1, y_p^2, y_p^3, \ldots, y_p^n, x_{MP}^1, x_{MP}^2, \ldots, x_{MP}^n; w) = \sum_{i=1}^{n} \phi_{MP}(y_p^i, x_{MP}^i; w_{MP}) + \sum_{i=1}^{n-1} \phi_P(y_p^i, y_p^{i+1}; w_P)$$

P(Y|X) is probability of having a set of interaction labels (Y) given a set of input features (X) and P is based on the normalisation function Z(X) and the likelihood function E(X,Y;W). W represents the model parameter.

In Equation (2):

n is the number of interactions;

$Y=(Y_p^1, Y_p^2, Y_p^3, \ldots, Y_p^n)$ represents the output variables in the CRF model;

$y=(y_p^1, y_p^2, y_p^3, \ldots, y_p^n)$ is a value of Y, and y∈Y. Each $y_p^i$ (ie 611) represents an play action label from a label set S which contains fixed number of states;

$X=(X_{MP}^1, X_{MP}^2, X_{MP}^3, \ldots, X_{MP}^n)$ represents the input variables in the CRF model;

$x=(x_{MP}^1, x_{MP}^2, x_{MP}^3, \ldots, x_{MP}^n)$ is a value of X, and x∈X.

Each $x_{MP}^i$ is a concatenation of $x_M^i$ and $x_P^i$, i.e., $x_{MP}^i = x_M^i, x_P^i$.

In particular, $x_M^i$ (ie 613) is a feature vector which is obtained by concatenating the moment classification scores 587 from both the start and end action moments of an play action, and the following values:

Whether the play-agent's track id is the same as that of the play-target: 1 if they are the same and 0 otherwise.

Whether the play-agent's team ids is the same as that of the play-target: 1 if they are the same and 0 otherwise.

Optionally, the ball position at both the starting and ending action moments: 1 if the ball is in goal area and 0 otherwise.

Specifically, $x_P^i$ is feature vector which is obtained by concatenating the contextual features extracted from the play state, play object tracking, and player role information, namely

- A binary valued variable to encode the play state information: for the i-th play, the value of the variable is set to 1 if (i+1)-th play is a non-play and 0 otherwise.
- A vector of size 3 to encode the play object location information: the default value is 0,0,0. For the i-th play, if the play object of the (i+2)-th play starts in Region j (1≤j≤3), then we set the (i−1)-th bit to 1.
- A binary valued variable to encode the player role information. For the i-th play, if the ball is started by a goalie at the (i+2)-th play, then it is set to 1 and 0 otherwise.

$\phi_{MP}(y_P, x_{MP}; w_{MP})$ (ie 615) is the unary potential function which models the dependencies between an play action label $y_P$ and the play action feature $x_{MP}$. $w_{MP}$ is the model parameter of the potential function.

$\phi_P(y_P, y_P'; w_P)$ (ie 612) is a pairwise potential function which models the dependencies (e.g. statistical correlation) between play action label $y_P$ and $y_P'$. $w_P$ is the model parameter of the pairwise potential function.

Given a training set $\{(x^i, y^i)\}_{i=1}^m$ ($x^i \in X$, $y^i \in Y$), with m training examples, the model parameters $w_{MP}$, $w_P$ for the CRFs may be found in the max-margin framework for solving structural support vector machine.

FIG. 6c is a flow diagram for an example of a method 630 of classifying the play actions based on recognised moment actions 139 and play state 111, play object tracking 320, and player role information 138 using the trained CRF model 604 in FIG. 6a.

An action moment classification step 631, performed by the processor 1105 executing the PSI software program 1133, determines an associated feature vector $x_M$ (ie 613) for each play P. A following context encoding step 632, performed by the processor 1105 executing the PSI software program 1133, determines a contextual feature vector $x_P$ (ie 614) for each play P.

A following unary potential function determination step 633, performed by the processor 1105 executing the PSI software program 1133, determines a unary potential function $\phi_{MP}$ 615 using $x_M$, $x_P$, and the model parameters $w_{MP}$, $w_P$. A following pairwise potential function determine step 634, performed by the processor 1105 executing the PSI software program 1133, determines a pairwise potential function $\phi_P$ 612 using $x_M$, $x_P$, and the model parameters $w_{MP}$, $w_P$.

A following step 635, performed by the processor 1105 executing the PSI software program 1133, determines the total potential function as the aggregate of all potential functions. A following step 636, performed by the processor 1105 executing the PSI software program 1133, determines the label $y_P$ for a play action P as the label that maximises the total potential function. This can be achieved by apply Bayesian belief propagation algorithms on the graphical model depicted in FIG. 6b.

Classify Play Actions Embodiment II

Figure 7:
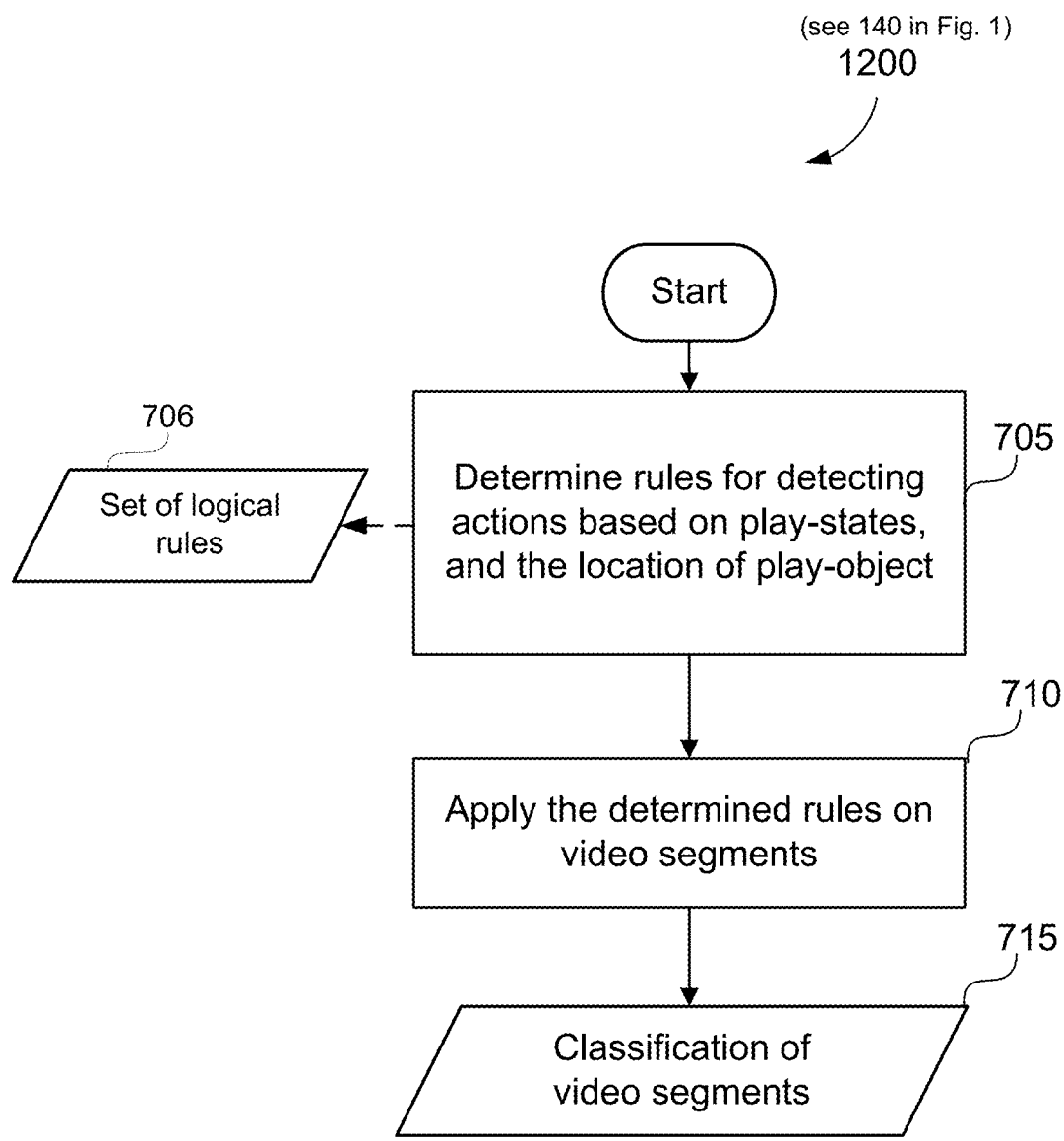
FIG. 7 is a schematic flow diagram illustrating a method of classifying actions based on recognised actions, play state and ball location information according to a further embodiment of the invention.

FIG. 7 is a schematic flow diagram of an example of a method 1200 for an alternative embodiment for classifying the play actions based on recognised moment actions 139, play state 111, play object location (determined as part of play object information 320 and player role information 138, as executed in the play action classification step 140 in FIG. 1.

The method 1200 uses the ontology associated with the target use-case, and in the rule determination step 705, performed by the processor 1105 executing the PSI software program 1133, formalises a set of logical rules 706 which can be used to classify play actions. A following rule-based play action classification step 710, performed by the processor 1105 executing the PSI software program 1133, classifies the localised play actions 142 using symbolic logical inferencing based upon the set of logical rules 706. In particular, for any localized video segment 133 determined in the segment localisation step 130, the rule-based play action classification step 710 uses logical inference to find the rule from the set of rules 706 which best matches the attributes of the play action (e.g., actions of the play-agent and play-target, the play state of the segment-after-next, the location of the soccer ball at the segment-after-next, and the role of the play-agent that starts the play object at the segment-after-next, etc.), and classifies the play action as per the best matching rule generating the play action classification 715 as the output.

The play action attributes which are used in the rules determined in the rule determination step 705 may include the determined roles 138 of the play-agent and play-target as determined in the role determination step 135, the determined action moments 131 of the play-agent and play-target as determined in the action detection step 130, the location of the play-agent and play-target as derived from the tracks 220 determined in people tracking step 115, the location of the play object as estimated from the tracks 320 determined in play object tracking step 120, and the received play state information 111 at step 110. A domain expert may also use other attributes relevant to the target use-case in the rule determination step 705.

The set 706 of rules determined in the rule-determination step 705 needs to constitute a complete set; i.e., there must be at least one rule which can be applied to any play action determined in the segment localisation step 130. One way to achieve completeness of the rule set 706 is to have a default play action class and a default rule with a lowest priority which can be used to classify the play actions which cannot be matched to any of the other rules (with higher priority). If more than one rule can be matched to a detected play action, the rules must have priority so that the rule-based play action classification step 710 can prioritize the rules and determine the best matching rule which is to be used to classify the play action.

FIG. 8 is a depiction 800 of an example of a sports field for a ball sports game. In an example embodiment for recognising play actions in futsal games, to use features from the segment-after-next, the futsal ontology has been extended to include the three new regions on the playing field as shown in FIG. 8. Three new action moments of Ball-starts-in-region-1, Ball-starts-in-region-2, and Ball-starts-in-region-3 are also defined and added to the ontology of action moments when the ball transits from not being in play, to being in play and being in the corresponding region. Table 3 below includes the definitions of these action moments.

TABLE 3

| | Action moments related to the regions shown in FIG. 8 |
|---|---|
| Ball-starts-in-region-1 | Definition: That moment where the ball transitions from not being in play, to being in play and being in region 810. Such a region is also called Region-1. This moment corresponds to the start of the game after a Shoot-success play. |
| Ball-starts-in-region-2 | Definition: That moment where the ball transitions from not being in play, to being in play and being in region 815 or region 825. Such a region is also called Region-2. This moment corresponds to the start of the game after a Ball-off-field moment. |
| Ball-starts-in-region-3 | Definition: That moment where the ball transitions from not being in play, to being in play and being in region 845 or region 835. Such a region is also called Region-3. |

Table 3 includes the rules (from the set of rules 706) used for futsal play classification in an example embodiment. The symbolic play classification rules listed in Table 3 are in Backus-Naur form (BNF), which is commonly used in context-free grammars. In Table 3, words in bold represent terms defined in futsal ontology. The first column shows the class label when the condition in the second column is true.

The rules in Table 3 should be combined with the pre-conditions that 'A1 is a Player' and 'A2 is a Player'.

A Touch-moment is the super-class of primitive moment actions and includes Hit-moment, Leg-kick, Leg-receive, Shoot-start, Pass-start, Dribble-moment, Head-receive, Head-hit, Goal-keeper-receive, and Goal-keeper-throw.

TABLE 4

| | symbolic rules used for play-classification | |
|---|---|---|
| Play action | Rules | Rule description |
| Shoot-success | A1 is Play-agent & <br> ( <br> (Touch-moment-start(A1) & <br> next(Touch-moment-start(A1)) == Ball-in-goal-area) <br> \| <br> (Touch-moment-start(A1) & <br> next(Touch-moment-start(A1)) == No-play & <br> next(next(Touch-moment-start(A1))) == Ball-starts-in-region-1) <br> ) | Play label Shoot-success is selected when the action Moment of the Play-agent is a Touch-moment followed by Ball-in-goal-area Moment, or the action Moment of the Play-agent is any Touch-moment followed by a No-Play episode, followed by Ball-starts-in-region-1 moment. |
| Shoot-failure | A1 is Play-agent & <br> A2 is Play-agent of next(next(Touch-moment-start(A1))) & <br> ( <br> (Touch-moment-start(A1) & <br> next(Touch-moment-start (A1)) == Ball-near-goal & <br> A1. On-team ≠ field .side.owning-team) <br> \| <br> (Touch-moment-start(A1) & <br> next(Touch-moment-start (A1)) == Ball-off-field & <br> A2. Is-goal-keeper & <br> A1. On-team ≠ A2. On-team) <br> ) | Play label Shoot-failure is selected when the action Moment of the Play-agent is any Touch-moment which results in Ball-near-goal Moment close to the opposing team side of the playing field; or any Touch-moment which results in Ball-off-field moment, and the Goal-keeper of the team opposing the Play-agent's team restarts the game after ball going off field. |
| Pass-success | A1 is Play-agent & A2 is Target (Play) & <br> A1. On-team == A2. On-team) & <br> A1≠ A2 & <br> X'Touch-moment (A1) & <br> Touch-moment (A2) | Play label Pass-success is selected when the Play-agent and the (Play) Target are different players from the same Team; and the action Moment of the Play-agent and that of the (play) Target are Touch-action moments. Pass-success corresponds to the successful passing of the ball amongst players of the same team. |
| Pass-failure | A1 is Play-agent & A2 is Target (Play) & <br> A1. On-team ≠ A2. On-team) & <br> A1≠ A2 & <br> Touch-moment (A1) & <br> Touch-moment (A2) | Play label Pass-failure is selected when the Play-agent and the (Play) Target are different players from the opposite Teams, and the action Moment of the Play-agent and that of the (play) Target are Touch-action moments. Pass-failure corresponds to the play in which a player fails to successfully pass the ball to another player of the same team, and a player of the opposing team gains the possession of the ball. |

TABLE 4-continued symbolic rules used for play-classification

| Play action | Rules | Rule description |
|---|---|---|
| Clearance | A1 is Play-agent & <br> A2 is Play-agent of next(next(Touch-moment-start(A1))) <br> & <br> ( <br> (Touch-moment-start(A1) & <br> next(Touch-moment-start (A1)) == Ball-off-field) & <br> ~A2. Is-goal-keeper <br> \| <br> (Touch-moment-start(A1) & <br> next(Touch-moment-start (A1)) == Ball-near-goal & <br> A1. On-team == field. side.owning-team) <br> \| <br> (Touch-moment-start(A1) & <br> next(Touch-moment-start(A1)) == Ball-off-field & <br> next(next(Touch-moment-start(A1))) == Ball-starts-in-region-2 & <br> ~A2. Is-goal-keeper ) <br> ) | Play label Clearance is selected when the action Moment of the Play-agent is any Touch-moment which results in Ball-off-field Moment, or a Ball-near-goal Moment matching the team-id of the Play-agent. After a Clearance Play, the game does not restart by a goal-keeper. |
| Dribble | A1 is Play-agent & <br> A2 is Target (Play) & <br> (Touch-moment (A1)) & (Touch-moment(A2)) & <br> (A1== A2) | Play label Dribble is reselected when the Target of the Play is the same Player as the Play-agent and the action moment of the Play-agent is a Touch-moment. |

The rule-based approach can be considered as a knowledge-based approach in the sense that, the play types are determined by checking important features against predefined rules Based on the analysis of the domain of interest and relevant ontology, corresponding play action classification rules relevant to the other applications and use-case can be defined.

Example(s)/User Case(s)

Classifying play actions may be a crucial task in automatic sports analytics. In one example, the actions of players inside a futsal match are observed through a sports analytics system. Consider a play action that occurs at the corner of the futsal field which cannot be captured by the camera properly due to camera view angle setup. In this case it is hard to infer the play action based on the visual information only. However if what comes next is a game pause followed by the gaolie starting the ball at the goal area, then we can easily conclude that that play action must be a shoot-failure.

The strong contextual clues provided by the information on play states, play object location, and player roles enables corresponding logical rules to be formed that can greatly increase the accuracy and utility of an action classification system, as shown in FIG. 7. Similarly, this information can be used in the statistical probabilistic inferencing method of 6c.

INDUSTRIAL APPLICABILITY

The arrangements described are applicable to the computer and data processing industries and particularly for the video processing industry.

The foregoing describes only some embodiments of the present invention, and modifications and/or changes can be made thereto without departing from the scope and spirit of the invention, the embodiments being illustrative and not restrictive.

The claims defining the invention are as follows:

1. A method of classifying an action in a video of a sports event, the method comprising:

receiving a first video segment corresponding to a predetermined action and a second video segment in the video of the sports event, wherein the second video segment is the segment in which a play object is located in one of a predetermined set of regions in a field of the sports event and the second video segment occurs after the first video segment;

determining a location of the play object in one of the predetermined set of regions in the field of the sports event in the second video segment;

determining a role of a player interacting with the play object when the play object is located in one of the predetermined set of regions in the second video segment; and identifying a class of the predetermined action in the first video segment based on the determined location of the play object in the second video segment and the determined role of the player interacting with the play object in the second video segment.

2. The method of claim 1, further comprising a step of receiving a predetermined play state of the first video segment and a predetermined play state of the second video segment, the predetermined play state of the first video segment being different from the predetermined play state of the second video segment.

3. The method of claim 1, further comprising a step of determining a temporal location of the first and second video segments in the sports video.

4. The method according to claim 1, wherein the predetermined action is a goal and the class of the predetermined action is one of a shoot-success in which a player has made a goal, a shoot-failure in which a player attempts to shoot a goal but fails, and a clearance in which a player kicks the ball out of field.

5. The method according to claim 1, wherein the predetermined set of regions comprises a field centre region and one or more field boundary regions.

6. The method according to claim 2, wherein the predetermined play states are one of an on-play state, which indicates that the game is ongoing, and a non-play state, which indicates that the game is paused.

7. An apparatus for classifying an action in a video of a sports event, the apparatus comprising:
a memory; and
a processor in communication with the memory which executes the following:
receiving a first video segment corresponding to a predetermined action and a second video segment in the video of the sports event, wherein the second video segment is the segment in which a play object is located in one of a predetermined set of regions in a field of the sports event and the second video segment occurs after the first video segment;
determining a location of the play object in one of the predetermined set of regions in the field of the sports event in the second video segment;
determining a role of a player interacting with the play object when the play object is located in one of the predetermined set of regions in the second video segment; and
identifying a class of the predetermined action in the first video segment based on the determined location of the play object in the second video segment and the determined role of the player interacting with the play object in the second video segment.

8. A non-transitory computer readable storage medium storing a computer executable program for directing a processor to execute a method for classifying an action in a video of a sports event, the method comprising the steps of:
receiving a first video segment corresponding to a predetermined action and a second video segment in the video of the sports event, wherein the second video segment is the segment in which a play object is located in one of a predetermined set of regions in a field of the sports event and the second video segment occurs after the first video segment;
determining a location of the play object in one of the predetermined set of regions in the field of the sports event in the second video segment;
determining a role of a player interacting with the play object when the play object is located in one of the predetermined set of regions in the second video segment; and
identifying a class of the predetermined action in the first video segment based on the determined location of the play object in the second video segment and the determined role of the player interacting with the play object in the second video segment.

* * * * *